(12) United States Patent
Bendik

(10) Patent No.: US 7,810,027 B2
(45) Date of Patent: *Oct. 5, 2010

(54) DOCUMENT MANAGEMENT SYSTEMS AND METHODS

(76) Inventor: Mary M. Bendik, 5412 Madison Ave., Bethel Park, PA (US) 15129

( * ) Notice: Subject to any disclaimer, the term of this patent is extended or adjusted under 35 U.S.C. 154(b) by 1133 days.

This patent is subject to a terminal disclaimer.

(21) Appl. No.: 11/414,827

(22) Filed: May 1, 2006

(65) Prior Publication Data

US 2006/0195778 A1 Aug. 31, 2006

Related U.S. Application Data

(63) Continuation of application No. 10/027,879, filed on Dec. 21, 2001, now Pat. No. 7,127,670, which is a continuation of application No. 09/378,785, filed on Aug. 23, 1999, now abandoned.

(51) Int. Cl.
*G06F 17/00* (2006.01)
(52) U.S. Cl. .................... 715/255; 715/200
(58) Field of Classification Search ............ 715/200, 715/255, 752
See application file for complete search history.

(56) References Cited

U.S. PATENT DOCUMENTS

| | | | |
|---|---|---|---|
| 5,142,678 A | 8/1992 | MacPhail | |
| 5,173,853 A | 12/1992 | Kelly et al. | |
| 5,181,162 A * | 1/1993 | Smith et al. | 715/209 |
| 5,421,015 A * | 5/1995 | Khoyi et al. | 718/107 |
| 5,727,156 A | 3/1998 | Herr-Hoyman et al. | |
| 5,752,020 A | 5/1998 | Ando | |
| 5,845,067 A | 12/1998 | Porter et al. | |
| 5,860,075 A * | 1/1999 | Hashizume et al. | 715/210 |
| 5,887,171 A | 3/1999 | Tada et al. | |
| 5,903,867 A * | 5/1999 | Watari et al. | 704/270 |
| 5,913,208 A | 6/1999 | Brown et al. | |
| 5,956,708 A | 9/1999 | Dyko et al. | |
| 5,999,664 A | 12/1999 | Mahoney et al. | |
| 6,005,597 A | 12/1999 | Barrett et al. | |
| 6,009,485 A | 12/1999 | Hosotsubo | |
| 6,016,393 A * | 1/2000 | White et al. | 719/315 |
| 6,029,182 A | 2/2000 | Nehab et al. | |
| 6,092,091 A * | 7/2000 | Sumita et al. | 715/209 |
| 6,094,647 A * | 7/2000 | Kato et al. | 1/1 |

(Continued)

FOREIGN PATENT DOCUMENTS

WO     WO 01/14984     3/2001

OTHER PUBLICATIONS

Fensel, Ontology-based Knowledge Management, IEEE 2002, pp. 56-59.*

(Continued)

*Primary Examiner*—Cong-Lac Huynh
(74) *Attorney, Agent, or Firm*—Bartony & Associates, LLC

(57) ABSTRACT

A computer implemented method for managing documents includes the steps of: creating a document profile that includes fields of attributes of a document and generating a unique identifier for the document. The unique identifier includes at least a first portion including information descriptive of an attribute of the document and at least a second portion including an automatically generated number. The method preferably further includes the step of storing the document profile for the document.

21 Claims, 12 Drawing Sheets

U.S. PATENT DOCUMENTS

| | | | |
|---|---|---|---|
| 6,115,509 | A | 9/2000 | Yeskel |
| 6,179,492 | B1* | 1/2001 | Guy et al. .................... 717/169 |
| 6,185,587 | B1 | 2/2001 | Bernardo et al. |
| 6,192,383 | B1* | 2/2001 | Cragun ...................... 715/202 |
| 6,199,082 | B1 | 3/2001 | Ferrel et al. |
| 6,263,121 | B1* | 7/2001 | Melen et al. ................ 382/305 |
| 6,301,611 | B1* | 10/2001 | Matsumoto et al. ......... 709/217 |
| 6,324,551 | B1 | 11/2001 | Lamping et al. |
| 6,349,308 | B1 | 2/2002 | Whang et al. |
| 6,401,097 | B1 | 6/2002 | McCotter et al. |
| 6,424,968 | B1 | 7/2002 | Broster et al. |
| 6,463,447 | B2* | 10/2002 | Marks et al. ................ 715/234 |
| 6,473,778 | B1 | 10/2002 | Gibbon |
| 6,505,173 | B1 | 1/2003 | Weibel et al. |
| 6,610,104 | B1 | 8/2003 | Lin et al. |
| 6,684,369 | B1 | 1/2004 | Bernardo et al. |
| 6,751,620 | B2 | 6/2004 | Orbanes et al. |
| 6,826,727 | B1 | 11/2004 | Mohr et al. |
| 7,039,856 | B2* | 5/2006 | Peairs et al. ................ 715/200 |
| 7,051,019 | B1* | 5/2006 | Land et al. ......................... 1/1 |
| 7,149,959 | B1* | 12/2006 | Jones et al. ................. 715/234 |
| 2002/0080387 | A1* | 6/2002 | Grasso et al. .............. 358/1.15 |
| 2002/0087559 | A1* | 7/2002 | Pratt .......................... 707/100 |
| 2002/0087573 | A1 | 7/2002 | Reuning et al. |
| 2002/0111960 | A1* | 8/2002 | Irons et al. .................. 707/204 |
| 2002/0156801 | A1* | 10/2002 | Kitada et al. ................ 707/500 |
| 2003/0074632 | A1 | 4/2003 | Marks et al. |
| 2004/0030692 | A1* | 2/2004 | Leitermann .................... 707/4 |
| 2004/0125402 | A1* | 7/2004 | Kanai et al. ................. 358/1.15 |
| 2005/0071328 | A1* | 3/2005 | Lawrence ...................... 707/3 |
| 2006/0168315 | A1* | 7/2006 | Daniell et al. ............... 709/237 |

OTHER PUBLICATIONS

Heery et al., Application Profiles: Mixing and Matching Metadata Schemas, Google Sep. 2000, pp. 1-10.*

Milstead et al., Metadata: Cataloging by Any Other Name, Google Jan. 1999, pp. 1-13.*

Hong, S.B., et al.; Classifying and Retrieving Software Components Based on Profiles, IEEE Sep. 1997, abstract.

Lee, Yong K., et al.; Querying Structured Hyperdocuments, IEEE Jan. 1996, 155-164.

Gershon, N., Moving Happily Through the Word Wide Web, IEEE Mar. 1996, 72-75.

Hill, K., A perspective: The Roll of Identifiers in Managing and Protecting Intellectual Property in the Digital Age, IEEE, vol. 87; No. 7; (1999); 1228-1238.

Gadney, H. M.; Acess Control for Large Collections, ACM; vol. 15; No. 2; (1997); 154-194.

Ceri et al., Design Principles for Data-Intensive Web Sites, SIGMOD Record, vol. 28, No. 1, Mar. 1999, pp. 84-89.

Hong, S.B., et al.; Classifying and Retrieving Software Components Based on Profiles, IEEE Sep. 1997, abstract.

Lee, Yong K., et al.; Querying Structured Hyperdocuments, IEEE Jan. 1996, 155-164.

Gershon, N., Moving Happily Through the Word Wide Web, IEEE Mar. 1996, 72-75.

Hill, K., A perspective: The Roll of Identifiers in Managing and Protecting Intellectual Property in the Digital Age, IEEE, vol. 87; No. 7; (1999); 1228-1238.

Gadney, H. M.; Acess Control for Large Collections, ACM; vol. 15; No. 2; (1997); 154-194.

* cited by examiner

| Document Profile | Document Content |
|---|---|
| Attributes:<br>　Author<br>　Title<br>　Office<br>　Number<br>　Type<br>　Client<br>　Matter<br>　Access<br>　Comments<br>　Additional Documents<br>　Links<br>　　.<br>　　.<br>　　.<br>　　.<br><br>30 | Text<br><br>Graphics<br><br>BLOB<br><br>Video<br><br>Audio<br><br>.<br>.<br>.<br><br>20 |

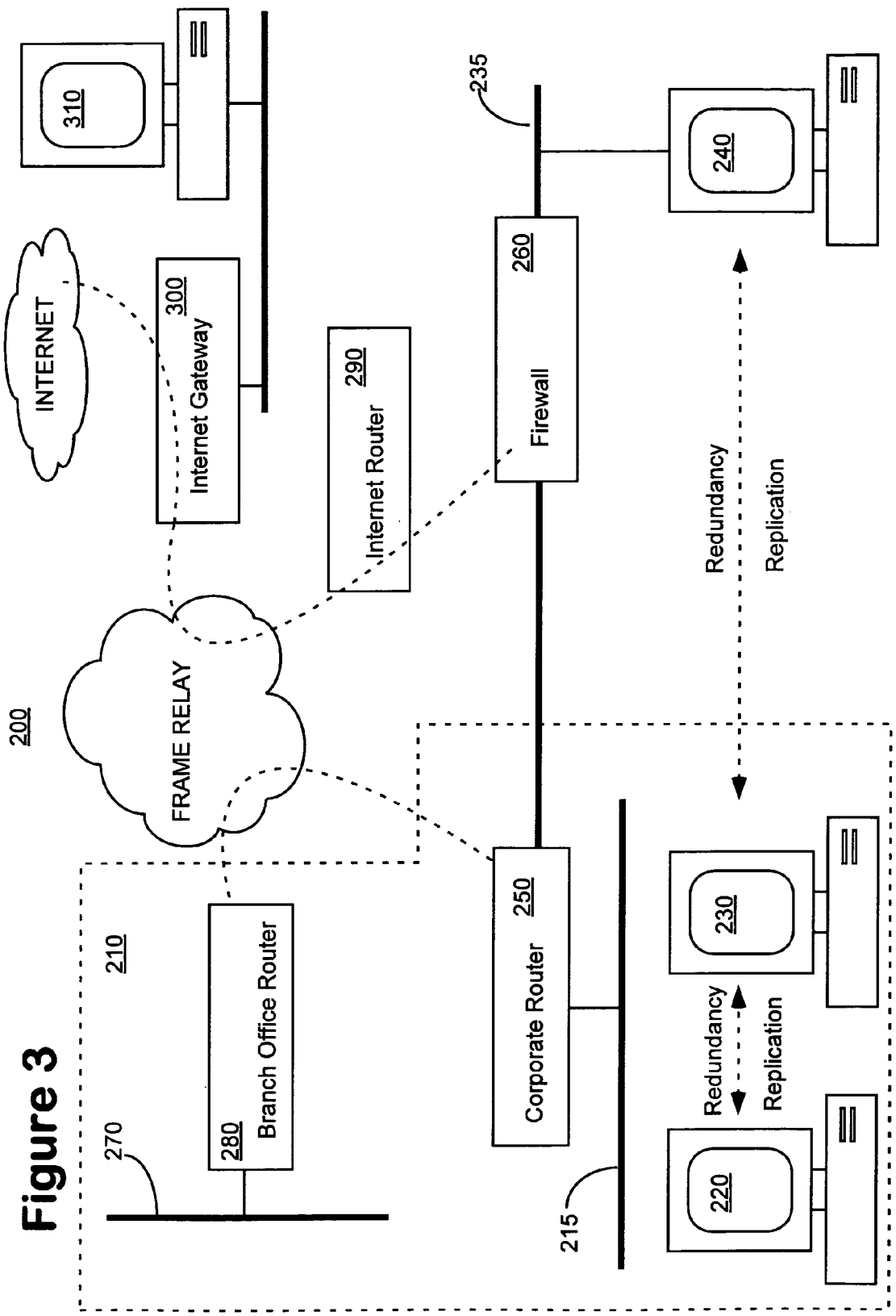

DOCUMENT MANAGEMENT SYSTEMS AND METHODS

CROSS-REFERENCE TO RELATED PATENT APPLICATIONS

This application is a continuation application of U.S. patent application Ser. No. 10/027,879, filed Dec. 21, 2001 now U.S. Pat. No. 7,127,670, now allowed, which is a continuation application of U.S. patent application Ser. No. 09/378,785, filed Aug. 23, 1999, now abandoned, the disclosures of which are incorporated herein by reference.

FIELD OF THE INVENTION

The present invention relates to systems and methods for management of documents and particularly, to systems and methods for management of documents over a network of computers in which a user can gain access to the information repository from a computer having access to the network.

BACKGROUND OF THE INVENTION

The ability to gain timely access to important information on a computer, and, more particularly, on a computer network, is a necessity in today's competitive market. As the number of digital documents continues to grow, such access will only gain in importance.

Document management systems automate document management on computer networks and facilitate location and sharing of documents in workgroups without requiring knowledge of, for example, the DOS filename or physical location of a document. A document management system may also provide system administration functions by establishing criteria that are used to, for example, determine storage location and/or determine document archival actions. Furthermore, security criteria can be assigned to limit unauthorized access to documents.

Document management systems typically store critical information required to access a document in a document "profile." The profile may include document attributes or information about the document such as the document type, the author, the creation date, the access rights, etc. The profile information is stored in a database and is used to retrieve the document via a search or query without the user having to remember, for example, the DOS filename and storage location (for example, server\volume:directory\filename). Profiling thus provides quick access to documents.

In addition to locating documents from the information stored in the document profile, a number of document management systems also index document text allowing users to perform full-text searches to find documents. Such full-text searches can require somewhat lengthy searches in large databases.

Although a number of computer implemented document management programs or systems are currently available, it remains desirable to develop improved document management systems and methods.

SUMMARY OF THE INVENTION

The present invention provides a computer implemented method for managing documents including the steps of creating a document profile that includes fields of attributes of a document and generating a unique identifier corresponding to the document (that is, corresponding preferably to the document profile and the associated document content). The unique identifier includes at least a first portion including information descriptive of an attribute of the document and at least a second portion including an automatically generated number. The method preferably further includes the step of storing the document profile for the document. In one embodiment the first portion is descriptive of the author of the document. The second portion is preferably a sequentially generated number that is unique for the first portion. That is, there may be many documents having the same first portion (for example, the initials of the author), but each document identifier having the first portion preferably has a unique number for the first portion.

The present invention also provides a computer implemented method for managing documents including the steps of creating a document profile and selecting a predefined document template for the document during creation of the document profile. The document template defines the format of the document. Preferably, the document profile is stored before any information is entered into a content of the document.

The present invention also provides a computer implemented method for managing documents including the steps of creating a document profile and linking the document profile to a file type that is not created within the document management system. As used herein, the phrase file type refers to generally any stored information that can be read or used by an associated software application. The file type may, for example, be a word processing document, a spreadsheet document, a database record (for example, an email message) or a URL link. Selecting the link from the document profile preferably launches or switches to the software application associated with the file type.

The present invention also provides a method for managing documents including the steps of creating a document profile, storing the document profile, and creating an email message including a link to the document profile so that a recipient of the message can access the document associated with the document profile. Preferably, the email message is created from within the document management system. That is, the user of the document management system can create the email without having to exit the document management system and switch to an email program.

The present invention also provides a method for managing documents including the steps of creating a document profile, storing the document profile, and creating an email message including a copy of the document from within the document management system so that a recipient of the message can access the copy of the document.

The present invention also provides a method for managing documents including the step of defining user access permission for a document profile or an associated document content in the document profile. The step of defining user access permission preferably includes the step acquiring the identity of the user from a source external to the document management system. The source of the identity of the user may, for example, be an operating system security system or a database security system.

The present invention also provides a method for managing documents including the steps of creating at least one document profile that includes fields of attributes of an associated document content and storing the document profile in a database. The method also includes the steps of storing the document content external to the database in a file system of a first storage device and replicating the document content from the first storage device to a second storage device.

As clear to one skilled in the art, any two or more of the above-identified methods of the present invention can be practiced in a single document management system. The present invention also provides a machine readable medium having stored thereon data representing sequencing of instructions for carrying out the above methods, which, when executed by a computer system (as known in the art), cause the computer system to perform the steps of the method(s).

The present invention also provides a computer implemented document management system including a module to create a document profile to be stored in a database in the storage device and, for example, a module to generate a unique identifier for the document. The unique identifier preferably includes at least a first portion including information descriptive of an attribute of the document and at least a second portion including a number generated by the unique identifier generation module.

The document profile creation module preferably further includes a module to select a predefined document template for the document during creation of the document profile. The document profile creation module preferably also includes a module to link the document profile to a file type that is not created within the document management system on an existing document profile.

The document management system preferably further includes a module to link an email message having a link to the document profile so that a recipient of the message can access the document associated with the document profile. The document management system also preferably includes a module to email a message comprising a copy of the document from within the document management system so that a recipient of the message can access the copy of the document.

The document management system preferably further includes a module to define user access permission in the document profile by acquiring the identity of the user from a source external to the document management system.

The present invention and its attendant advantages will be further understood by reference to the following detailed description and the accompanying drawings.

BRIEF DESCRIPTION OF THE DRAWINGS

FIG. 1 illustrates a document including a document profile and document content.

FIG. 3 illustrates a network architecture suitable for use with the document management system of the present invention.

DETAILED DESCRIPTION OF THE INVENTION

The present invention provides for management of documents over, for example, a wide area network in which a user can gain access to the information: repository from generally any computer having access to the network. Preferably, access to the documents is enabled via either a dedicated document management interface or via the use of a browser such as Microsoft® Internet Explorer® or Netscape® Navigator®.

In the document management program or system of the present invention, each document 10 (see FIG. 1) preferably comprises two parts, a document content 20 and a document profile 30. Document content 20 is the actual information contained within document 10 and can, for example, include BLOB, text, graphics, video and/or audio information. Document profile 30 includes attributes of the document including, for example, the title, the author, the office location, the document number, the type of document, and the date created. Document content 20 and document profile 30 may be stored together or separately.

Figure 2:
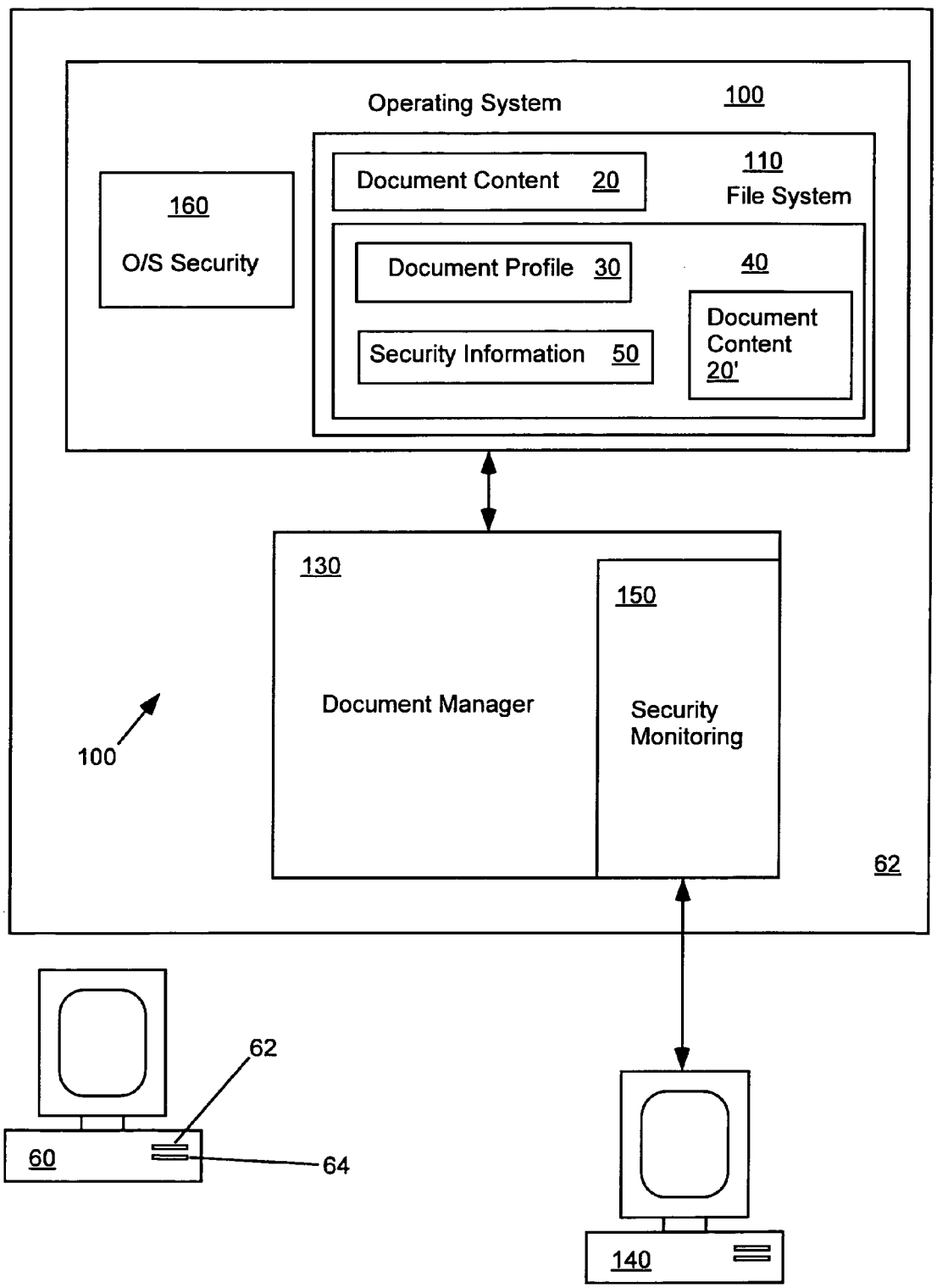
FIG. 2 illustrates an embodiment of the structure of a document management system of the present invention.

FIG. 2 illustrates an embodiment of a document management system of the present invention. In general, the document management system is executed by a computer 60 that includes a storage device 62 (for example, a compact disk or a hard drive as known in the art) and a processing unit 64. In the embodiment of FIG. 2, an operating system 110 and the document management system are both stored on a hard drive 62.

In this embodiment, operating system 110 includes a file system 120 that may contain document content 20 which are stored as individual files as known in the art. File system 120 also contains a database 40 that preferably includes document profiles 30 associated with document content 20 and security information. Preferably, document profile 30 contains security settings for each document profile 30 and a corresponding document content 20. A document profile 30 can, for example, be made public so that it is viewable/accessible by all users of the document management system. Access to document profile 30 can also be limited to a user or group(s) of users. Likewise, document content 20 can be made public or private. In the case that a particular document content 20' is made private, document content 20' is preferably stored as an object within database 40 rather than in file system 120 of operating system 110.

File system 120 is preferably a conventional computer-implemented file system such as provided, for example, in the Microsoft® Windows® operating system, the IBM® OS400 operating system, the UNIX® operating system or the Apple® Macintosh® operating systems. Database 40 is preferably a conventional structural information system storing information as a set of records and attributes or fields.

Security information 50 represents access control information to determine whether a particular user has permission rights to access the document management system and document profiles 30 and/or document contents 20. Document manager 130 accesses document profile 30 and document-content 20 and allows a client computer 140 access to document 10 formed by the combination of document content 20 and document profile 30 if permitted by security monitor 50 and the security information within document profile 30.

As described above, operating system 100 may include, for example, the Windows operating system family (for example, Windows NT®, Windows 98° or Windows 95°). Operating system 100 preferably contains a conventional operating system security 160. System security 160 is built into conventional operating system 100. For example, in the case of Microsoft Windows NT, a built in security system is provided which requires entrance of a password for a user to log into the system and thereby gain access to files and to the network. Similarly, many other conventional operating systems require a password or access code to allow a user operating client computer system 140 to log on. Preferably, operating system security 160 or another existing security feature (as provided, for example in Lotus Domino® server) is used by document manager 130 of the present invention to identify users and access permissions of such users. In that regard, security manager 150 of document manager 130 may connect to and operate in conjunction with operating system security 160 or, for example, the Central Administration Address Book of Lotus Domino, to identify users who may access the document management system as well as document profiles 30 and document contents 20 thereof.

Other document management systems typically require an administrator to create users or user tokens within those document management systems. Using an existing user list such as provided in a Lotus address book prevents duplicative labor and simplifies administration of the document management system. In use of the document management system of the present invention, a user is typically first required to log on to the operating system as determined by operating system security 160. The user may also be required to log onto a particular server such as the Lotus Domino server. A user permitted access to the document management system as determined by security monitoring 150 may then use the document management system. Whether the user has access to a particular document profile 30 and corresponding document content 20, is determined by security information established in document profile 30.

One embodiment of a network architecture 200 suitable for use with the document management system of the present invention is set forth in FIG. 3. In this embodiment, a corporate network or intranet 210 comprises, for example, two servers 220 and 230 on a local area network 215 in a main office. A number of client computer systems (not shown) are also preferably connected to network 215. Network 210 is preferably connected to another network 235 via a router 250 and a firewall 260. Network 235 is an extranet comprising an extranet server 240. The term "extranet" is used herein to describe a shared secure repository of information that is accessible from outside of intranet 210 (for example, over the Internet). Placing extranet server 240 on separate network 235 and isolating it from intranet 210 assists in protecting the network resources of intranet 210.

As known in the art, firewall 260 comprises a system designed to prevent unauthorized access to or from intranet 210. Firewall 260 can be implemented in hardware or software, or in a combination of both. Firewall 260 prevents unauthorized Internet users from accessing intranet 210. All messages entering or leaving intranet 210 pass through firewall 260, which examines each message and blocks those that do not meet specified security criteria.

Local area network 215 is preferably connected to other local area networks in the intranet via router 250. In FIG. 3, local area network 215 is connected to one other local area network 270 in a branch office via router 250 and branch office router 280 using, for example, frame relay protocol or asynchronous transfer mode (ATM).

Extranet 235 is preferably connected to the Internet via firewall 260 and an Internet router 290 using, for example, frame relay or ATM. Internet router 290 may be connected to an Internet gateway 300 and a web server, a DNS server, and a mail server 310 at an Internet Service Provider (ISP) to provided connection to the Internet.

In one embodiment discussed herein, the database architecture of the document management system of the present invention utilizes or is built upon Lotus Domino® server, Lotus Notes® Application Development. Tools and Lotus® Script language. Other architectures are possible, however. Information regarding the use of these Lotus tools is provided, for example, in *Lotus Notes Application Development I and II*, Release 5, Lotus Development Corporation (1999); *Lotus Notes Programmer's Guide, Release* 5, Lotus Development Corporation (1999), *Lotus Domino Administering the Domino System*, Release 5, Lotus Development Corporation, (1999); *Lotus Domino Managing Domino Databases*, Release 5, Lotus Development Corporation (1999); and *Lotus, Domino Configuring the Domino Network*, Release 5, Lotus Development Corporation (1999), the disclosure of which are incorporated herein by reference.

The Lotus Domino server family provides an integrated searching, indexing, messaging, intranet, extranet, and Internet applications software platform. Lotus Domino supports many different services/protocols including, for example, SMTP, MIME, S/MIME, SSL, POP3, IMAP4, LDAP, HTTP, HTML and SNMP.

Lotus Domino also facilitates access to information through a browser, making the information available to a user from anywhere via, for example, the Internet. Web-based access through a browser is automatically enabled by Lotus Domino without additional hardware or software. A database created in a Domino environment is, therefore, a browsable database. To access documents through the Internet in an environment other than Lotus Domino typically requires running an additional server (for example, Microsoft IIS) and a knowledge of HTML or Java to design an interface for a user to search or view the existing document database.

The integrated services of a Lotus Domino enterprise environment also simplify hardware requirements as compared to other architectures. For example, the hardware for the document management system of the present invention may comprise a single server to perform intranet/extranet and Internet- or web-based database functions with the use of Lotus Domino. Moreover, disaster recovery may, for example, be achieved through two inherent redundancy features: (1) replication, which is a scheduled process and (2) clustering, which is a real-time process.

Figure 4A:
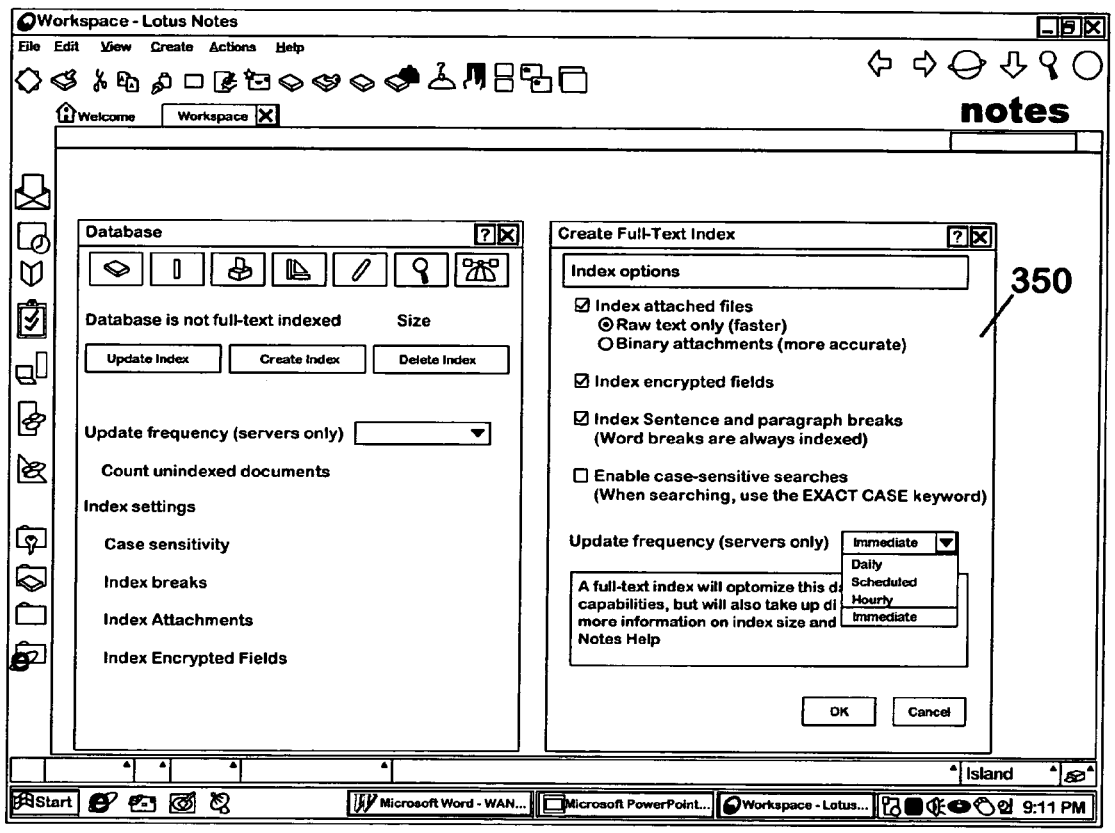
FIG. 4A illustrates a screen capture providing for full text indexing of documents.
Figure 4B:
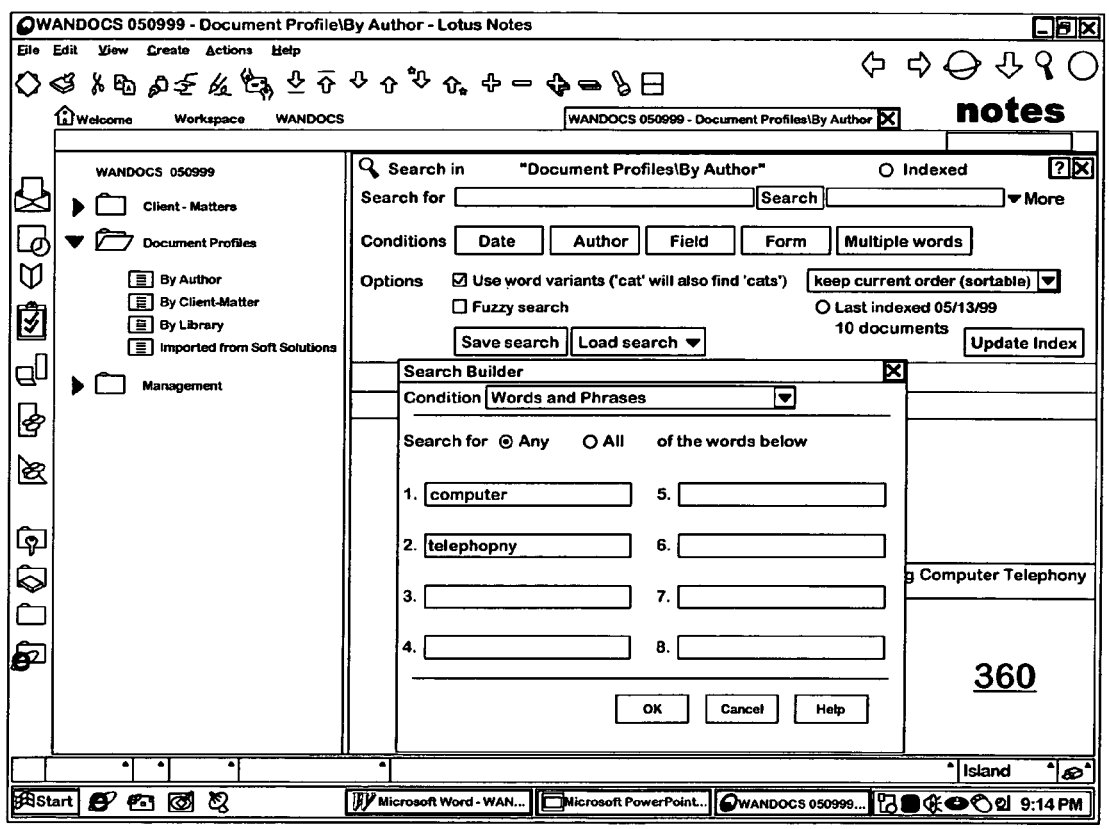
FIG. 4B illustrates a screen capture providing for searching capability.

Other server/client environments typically require separate software/hardware components to create full-text indexes and query capabilities. The Lotus Domino environment does not require these additional components. Full-text indexes are built by turning on the full-text index option inherent in Lotus Domino as illustrated in box 350 of FIG. 4A. Query capabilities are provided through a standard search bar or query by example form as illustrated screen 360 of FIG. 4B, which does not require the purchase of an SQL server.

As will be appreciated by one skilled in the art, however, all the functionality provided by Lotus Domino is available using other servers. For example, Microsoft NT Server can be used in conjunction with an indexing server such as Verity® and a searching server such as Microsoft SQL®. Internet applications can be provided by, for example, Microsoft IIS server, which enables/facilitates web access when used in connection with, for example, an HTML or JAVA front-end program to access the back-end database.

Figure 5A:
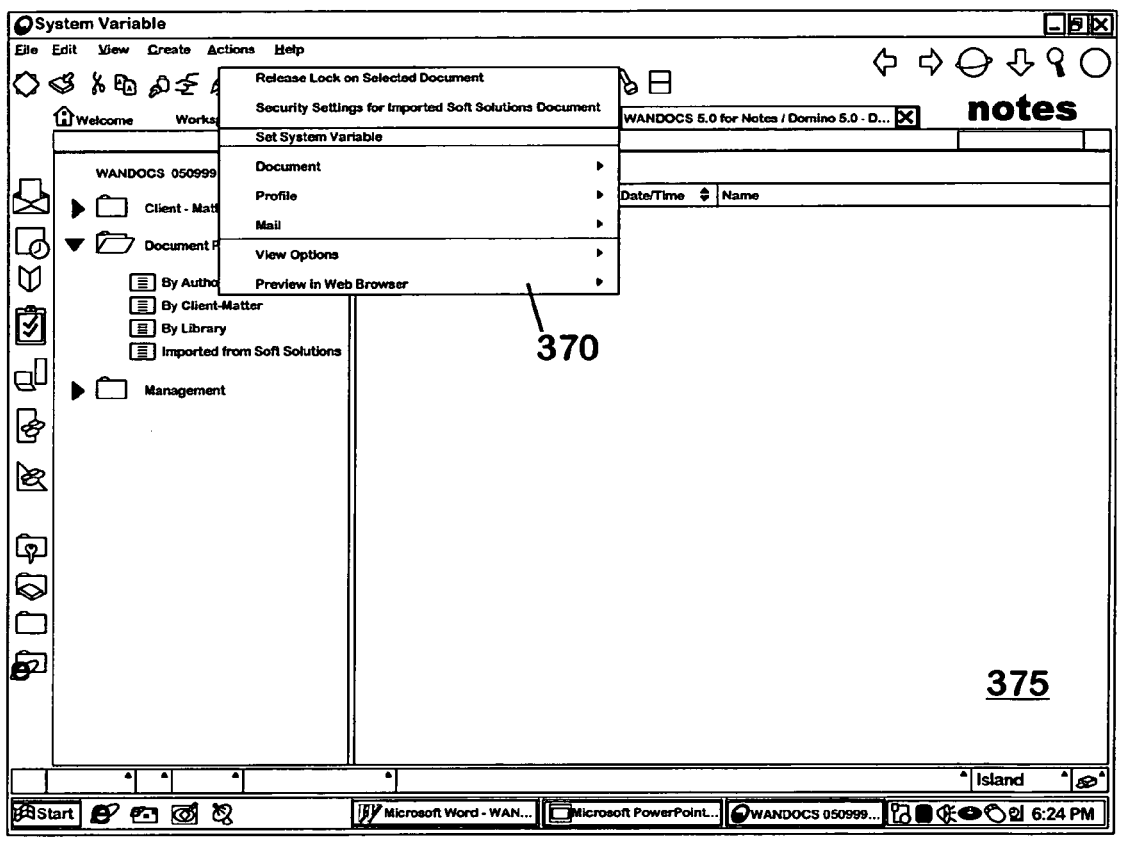
FIG. 5A illustrates a screen capture of initiation of a process for setting system variables.
Figure 5B:
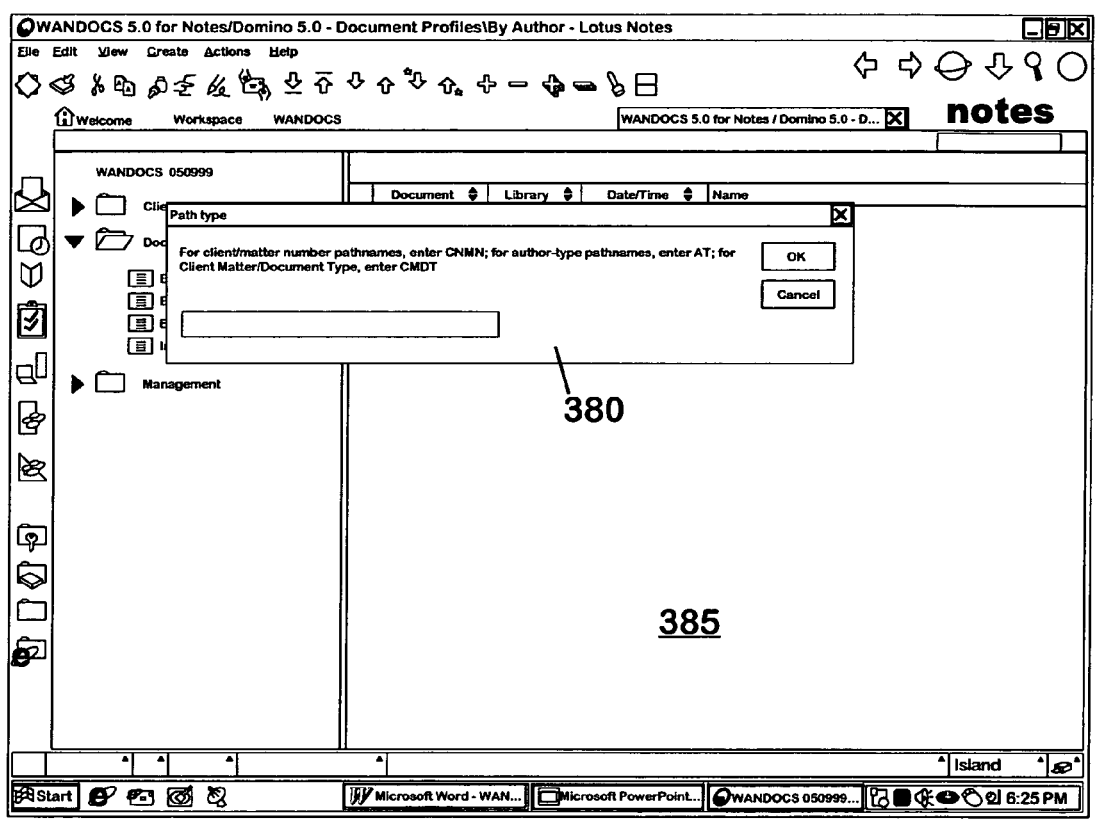
FIG. 5B illustrates a screen capture of an information/ variable query during setting of system variables.

Several system variables of the document management system of the present invention are preferably set by, for example, a network administrator during installation of the system. Preferably, the installation process includes answering a few queries or requests for information to set up system parameters through variables that define, for example, the location of document files and templates. The system variables setup process may be initiated by selecting Set System Variable from Actions menu 370 of screen 375 as illustrated in FIG. 5A. The answer to a first query preferably defines how an organization desires to store its documents as illustrated by query box 380 of screen 385 in FIG. 5B. Several options are preferably provided. Documents may, for example, be stored by Author/Document Type, Client/Matter, or Client/Matter/Document Type. The answer to a second query preferably defines the path where "public" document contents 20 are to be stored in file system 120. The answer to a third query preferably defines a mapped drive to identify the path of the document storage. A template directory and a mapped drive for the template directory are also preferably defined by the network administrator in response to other queries.

Setting these variables enables an administrator and/or a user to select any operating system/file system to store documents and templates. Documents and templates stored in file system 120 are preferably linked to database 40 in a manner so that any operating system and/or mapped drive can be used to store the documents and templates.

Unlike prior document management systems, the document management system of the present invention preferably provides for replication of all data in database 40 as well as all document contents 20 or other document management system date stored externally from database 40 to a secondary server to provide for redundancy. Although some current document management systems allow storage of documents external to the database thereof, these document management systems enable replication/redundancy of only documents and other data stored within the database. Preferably, the user/administrator of the document management system of the present invention is queried as to whether replication/redundancy is desired during the process of setting the system variables. If replication/redundancy is desired, another query is preferably made to set the drive mapping and path of the secondary server on which replicated documents are to be stored.

Preferably, the replication process takes place during Profile-New, -Edit, -Copy and -Save functions. During any of these functions, the document management system of the present invention preferably checks for the newest or most current version based on date and copies the most newest version to the replicated server. If for some reason the replicated server is not available, the document management system preferably marks the profile for replication to occur after the replicated server is once again available.

Figure 6A:
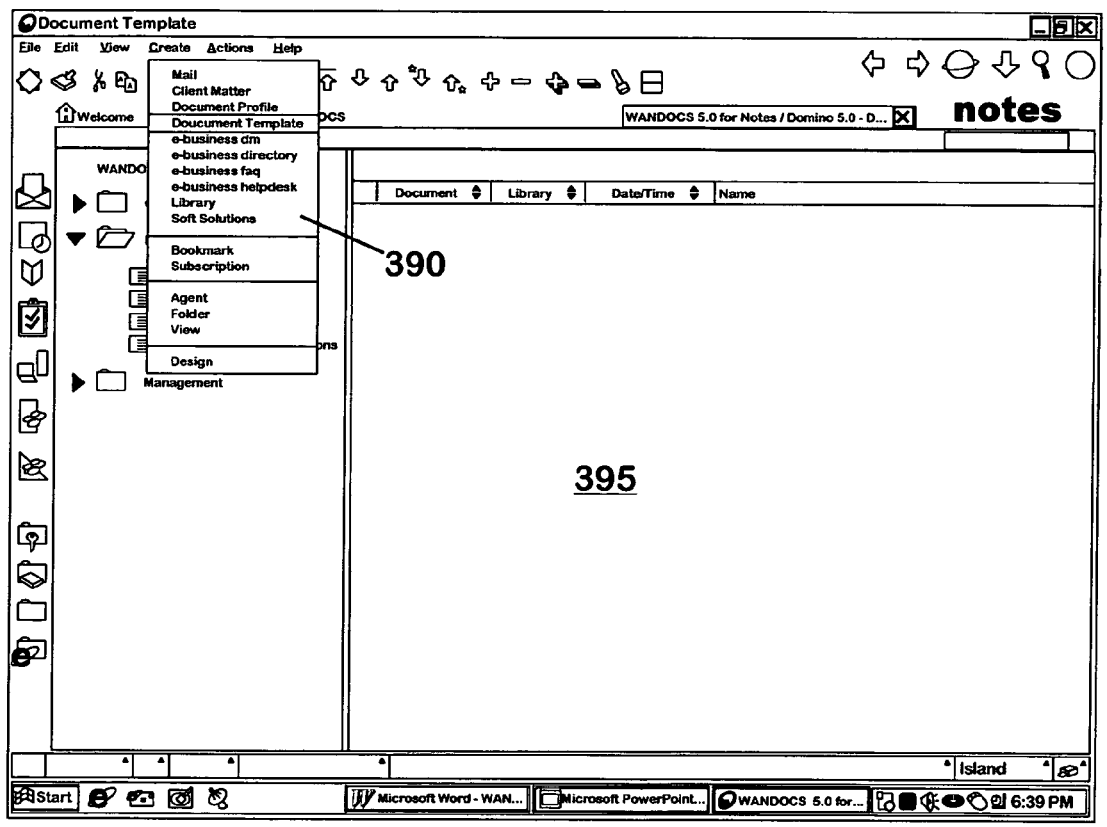
FIG. 6A illustrates a screen capture of initiation of a process for defining document templates.
Figure 6B:
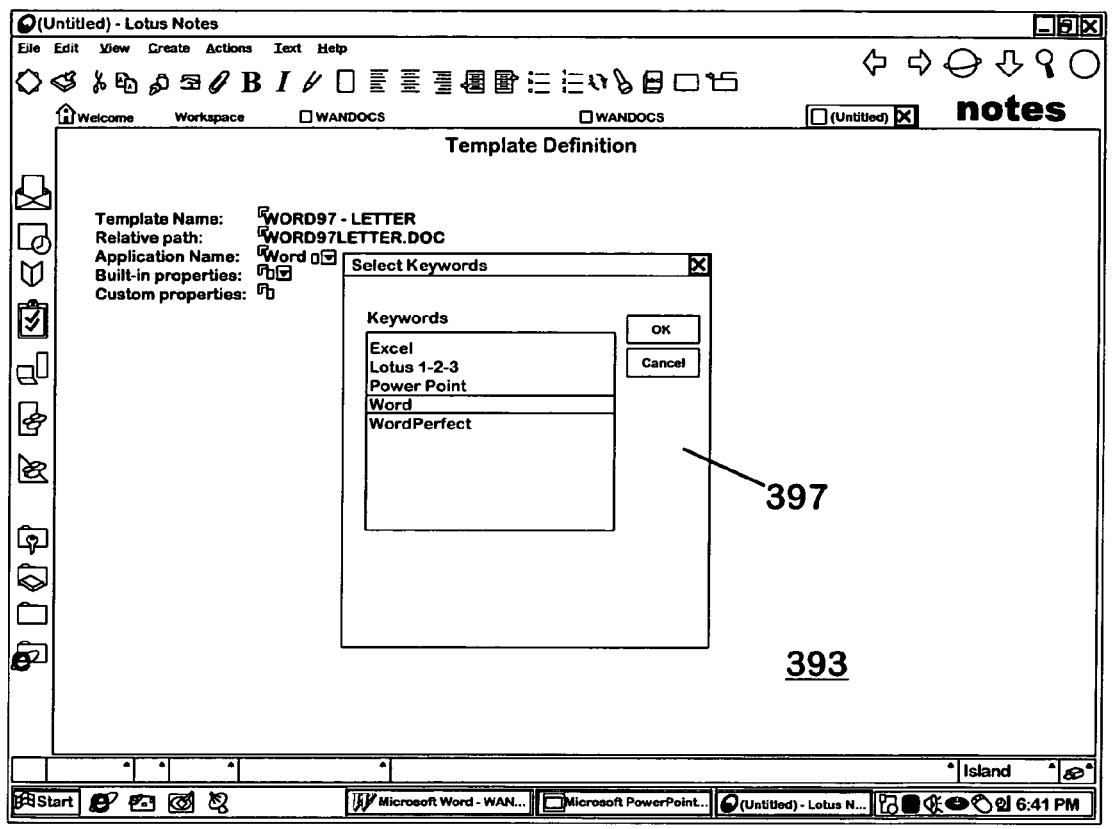
FIG. 6B illustrates a screen capture of definition of a document template.

Defining templates within a document management system is a another unique function of the document management system of the present invention. The system administrator or other person of the document management system of the present invention can set up templates based on software application and a document type (for example, letter, memorandum, budget, etc.) under the create menu 90 as illustrated in screen 392 of FIG. 6A. As illustrated in screen 393 of FIG. 6B, the administrator can define, among other things, a template name in field 394, a relative path for the template in field 395 and an application associated with the template in field 396. Preferably, the administrator is provided with a menu for each choice as illustrated by application menu 397 in FIG. 6B.

The user is thereby preferably presented with a pre-defined formatted document template that ensures compliance with company policy and consistent formatting in generating documents. All templates may include, for example, the company name/logo and a footer including a unique document identifier. The document template is preferably chosen by the user when completing document profile 30 and does not require the user to first launch the associated application. Such templates are discussed in further detail below.

Any number of parameters for organizing documents or identifying documents can be included in the document management system. For example, lawyers typically identify particular tasks with a particular client and a particular matter for that client. For example, the client may be NewCo, Inc. and the matter may be the NewCo, Inc. vs. OldCo, Inc. litigation. Client/Matter definitions preferably comprise unique alpha/numeric code and/or names. For example, the above client can be represented by a unique client name (for example, "NewCo, Inc." as well as a unique client number (for example, 20001). Likewise, the matter can be represented by a unique name (for example, "NewCo, Inc. vs. OldCo, Inc.") as well as a unique number (for example, 00001). This information can be typed into the document management system manually (by selecting Client-Matter in Create menu 390) or be imported electronically (from, for example, an existing database such as a billing system or other document management system) through, for example, an ASCII import/export.

A user or system administrator preferably also defines particular library that, for example, includes an office location and a Universal Resource Locator (URL) associated to each office specifying the name of the server and the path of the document storage as defined above to facilitate access to the database via the Internet.

Figure 7:
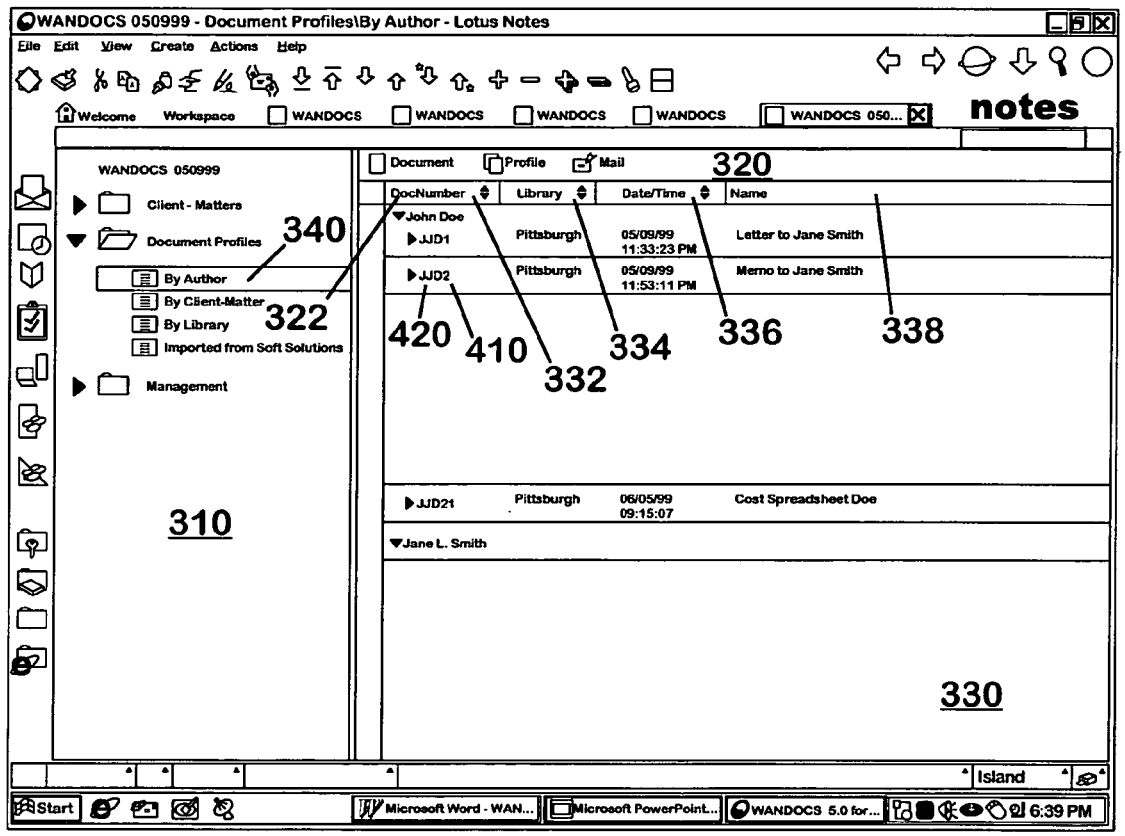
FIG. 7 illustrates a screen capture of an embodiment of a navigator of the document management system of the present invention.

FIG. 7 illustrates a screen capture showing a preferred embodiment of a navigator 300 of the document management system of the present invention or panes. Navigator 300 is preferably divided into three sections. A folder/view identifying pane 310 on the left side of navigator 300 preferably includes graphical representations of folders for organization of information and graphical representations for exhibiting predefined views for illustrating information (for example, a list of document profiles). In the embodiment of FIG. 7, for example, document profiles can be organized and viewed by author, by client-matter or by library. Other views can be defined by the user or an administrator. Such views are preferably continually updated and an index built with every newly created document. A second section of navigator 300 comprises an action bar 320 with dynamic buttons as known in the art to enable the user to perform a task or function. A third section of navigator 300 is a view pane 330 in which a view chosen in folder/view identifying pane 310 is presented. In FIG. 7, the By Author view 340 has been selected in folder/view identifying pane 310, and the document profiles are arranged by author in view pane 330. View pane 330 preferably includes pre-defined field sort buttons 332, 334, 336 and 338 which enable ascending or descending sort functions base on the fields or attributes below the view pane buttons. For example, the document profiles listed in FIG. 7 can be sorted by document number, library, date/time and document title or name using field sort buttons 332, 334, 336 and 338, respectively. Below field sort buttons 332, 334, 336 and 338 is a list of documents profiles that pertain to the selected view.

Action bar 320 may, for example, include a Document button 322 that when pressed exhibits a drop down menu allowing a user to Edit, View, or Print a document or documents corresponding to a selected (highlighted) document profile or profiles. A Profile button 324 is preferably provided to allow a user to Create, Copy, Edit, Print, or View a selected document profile via, for example, a drop down menu. A Mail button 326 is preferably provided to allow a user to mail a Link to Document, to mail a Copy of Document, or to Switch to a mail program in Notes (or another application) via a pull down menu.

Choosing to mail a Link to Document enables the user to automatically, from within the document management system, create an email message including a link to the profile record. The user is preferably switched to an email program to mail the link. The recipient of the email message can work on/edit the database record from their mail system. Choosing to mail a Copy of Document copies the external file corresponding to document content 20 from file system 120 to an email message. Preferably, the user is switched to the email program/system and to the email with the selected document selected. The recipient of the email message can edit the copy of the document. However, the document in the database record will remain unchanged.

Choosing to Switch to Notes (or another application or functionality—for example, Switch to Microsoft Outlook) serves a number of purposes. For example, it conveniently enables a user to switch to their mail, calendar or other features at any time while working in the document management system. It also operates with the Notes link field on the document profile screen which is described in connection with document profiles below.

Figure 8:
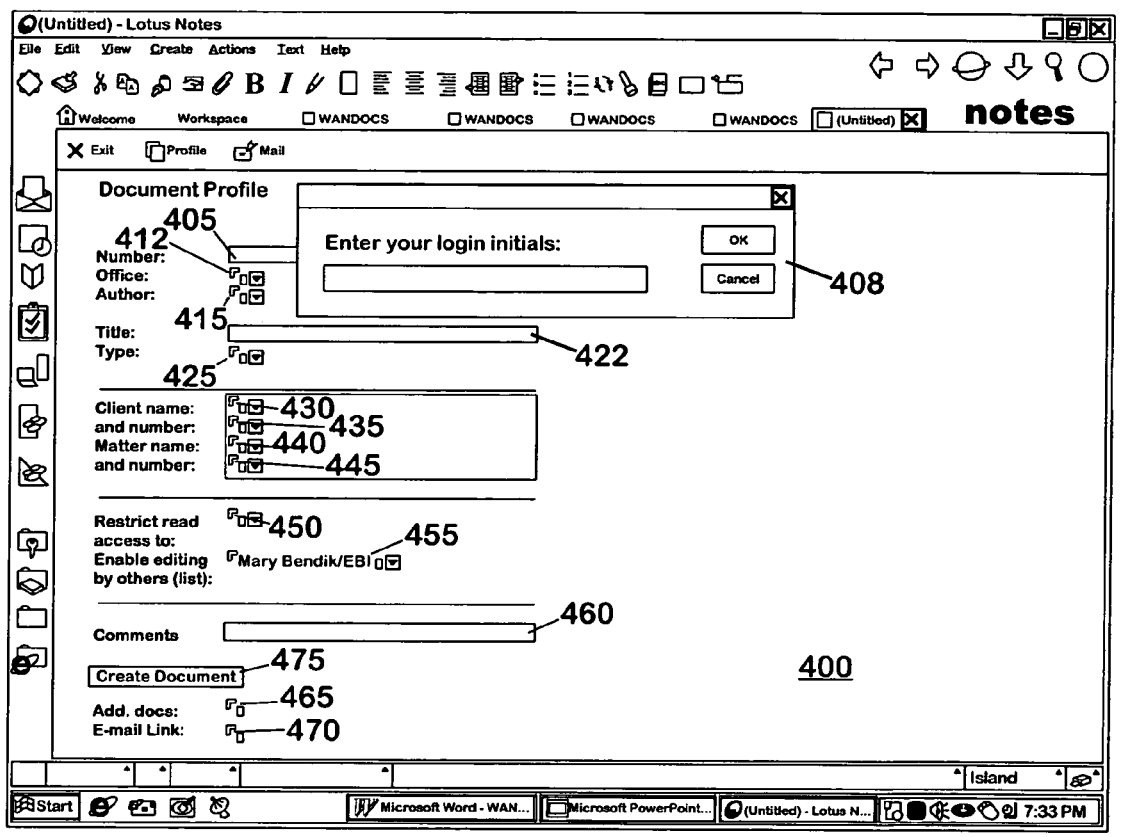
FIGS. 8 and 9 illustrate an embodiment of a document profile screen for use in the document management system of the present invention.
Figure 9:
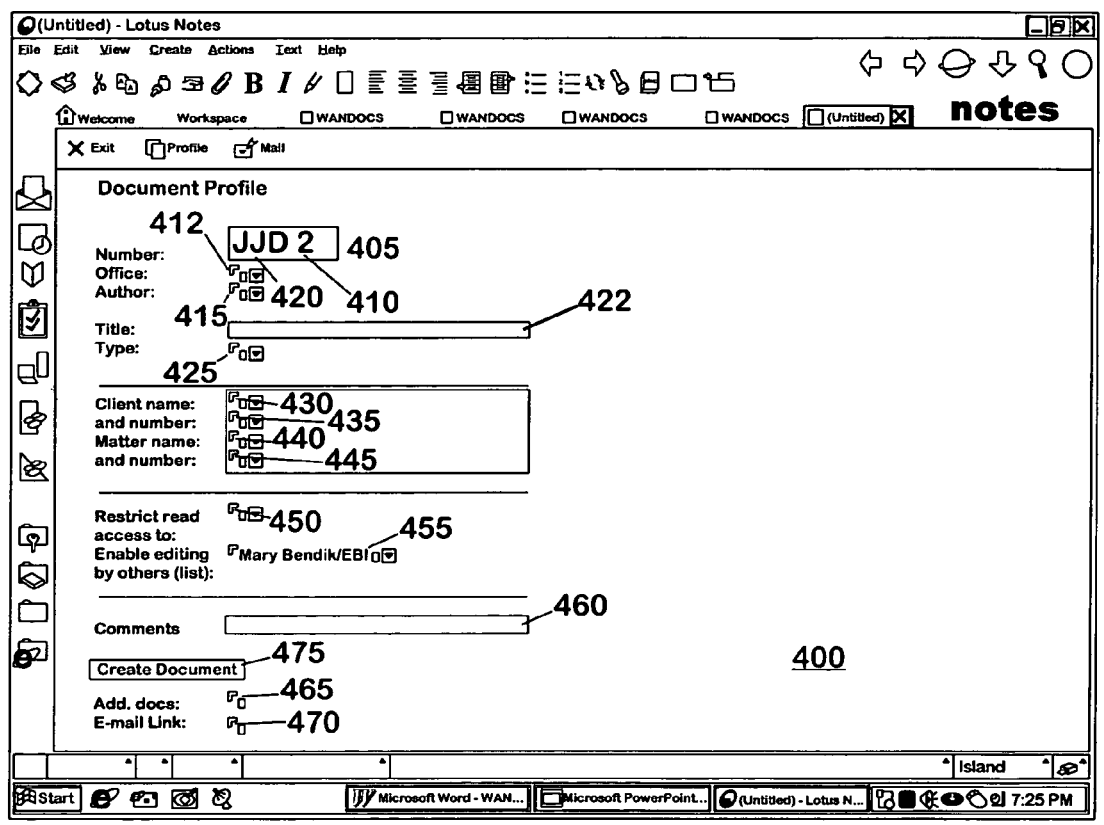

Document profile 30 is a very important function of the document management system of the present invention. As described above, document profile 30 includes the key fields of information or attributes that a user utilizes to define an associated document content 20. A document 10 can be located via text searching capabilities using the fields defined in associated document profile 30. An embodiment of a document profile screen 400 is illustrated in FIGS. 8 and 9.

Document profile screen 400 preferably appears as soon as a document is created so that document attribute fields (including a unique document identifier generated by the document management system) are established before the user enters data into document content 20.

Document profile 30 preferably includes any number of attribute fields to suitably identify/define associated document content 20. Like other document management systems, a unique document identifier/number is preferably generated by the document management system of the present invention. Unlike other document management systems, however, the unique document identifier comprises a numeric portion 410 (see FIG. 7) generated by the document management system of the present invention and one or more information portions 420 (for example, prefix(es) and/or suffix(es)) that assist in identifying documents by providing information about the document. For example, a preferably unique document identifier prefix may comprise a user's initials (typically entered at log on for example, John J. Doe would enter "JJD"). The document identifier will thus comprise the user's initials followed by, for example, a number unique for that individual (preferably, a sequential number generated by the document management system starting, for example, with the number one). For example, the first document as created by John J. Doe would have the document identifier jjd1. The document identifier preferably appears in a document identifier/number field 405 on document profile screen 400. A user may, for example, be required to enter the user's login initials when a document profile is created as illustrated by query box 408 of FIG. 8.

In this embodiment, a second user will have a document identifier prefix that comprises the user's initials (typically entered at log on—for example, Jane L. Smith would enter "JLS"). The document identifier for the second user will thus comprise the second user's initials followed by a sequential number generated by the document management system starting with the number one. The first document created by Jane L. Smith would have the document identifier jls1, while the twenty-first such document would have the document identifier jls21.

The unique document identifier of the present invention easily identifies how to locate a document without having to perform a search. A user can simply, for example, go directly to the By Author view discussed above in connection with FIG. 7 and locate the document corresponding to the identifier jjd1 without a query-by-example search that is necessary with other document management systems. The sequential number portion of the document identifier also serves as a productivity measure based on the number of documents a user generates. All other document management systems require a report writer function to produce these types of statistics.

An office field 412 preferably identifies the location/library in which a document is stored. Choices for office field 412 and several other fields described below are preferably provided through a pull down menu. An author field 415 identifies the author of the document. As with office field 412, a pull down menu is preferably provided to allow selection of an author. The menu is, for example, preferably generated using the Central Administration Address Book that is utilized for other Lotus applications. As discussed above, there is only one place to maintain a user list and the security associated with authentication in this manner. Many other systems require the user to have separate address books (i.e. one for e-mail, one for the operating system, one for document management, etc.).

A title field 422 is provided to enable the user to define a preferably descriptive title for the document. A document type field 425 is preferably provided and serves two purposes. First, document type field 425 identifies the application software that is being requested. Second, the type/template of document generated is also identified. For example, the application may be indicated as Microsoft Word 97® and the document type may be indicated a "Letter," which indicates that the user is selecting to create a letter using Microsoft Word 97. Moreover, as discussed above, a template is preferably associated with the type of document (LETTER in this example) that has a unique set of formatting instructions already in place for the creation of a document, providing improved productivity and consistency. A pull down menu is preferably provided for selection of a document type.

A client name field 430 and a corresponding client number field 435 may be provided with associated pull down menus. Likewise a matter name field 440 and a corresponding matter number field 445 are preferably provided with associated pull down menus. The client identifier fields 430 and 435 and the matter identifier fields 440 and 445 are preferably related to each other in a parent/child relationship. Preferably, the client identifier is the parent and the matter identifier is the child. Therefore, specific matter identifiers only appear based on the specific client selected. As discussed above, these fields may be populated by an ASCII imported file that is preferably updated periodically (for example, daily), from, for example, a billing system or program using an agent program provided in the document management system of the present invention. The agent program preferably specifies the import schedule and the action to be taken.

A security or restrict read access field 450 is preferably provided to define document security. Preferably, only individual(s) and/or group(s) selected/displayed in security field 450 can see that the document profile exists. In general, other document management systems are limited to defining groups or types of security. Likewise, a second security field 455 enables restriction access/editing privileges to document content 20. If nothing is entered in security field 450 or security field 455, document profile 30 and document content 20 will be public. As discussed above, the document management system of the present invention enables integration with the security system of, for example, the Central Administration Address Book of Lotus Domino to identify potential users and groups of users.

A comments field 460 is preferably provided to enable entrance of unlimited comments to enhance full-text search capabilities.

An add. docs (additional documents) field 465 (for example, a rich text field) is preferably provided to enable any number of multiple documents or any other file type (for example, document files, database records, or URL links) to be included on a single document profile. Other document management systems do not enable multiple documents to be contained on a single document profile. Additional document field 465 enables a user to attach file types and links that are external to the document management system (that is, file types that were not created within the document management system and that do not have an associated profile). Such documents may, for example, be related to the main document (that is, the document for which the document profile has been created). Other document management systems require the user to link only document profiles through a related document feature.

An email/other field 470 (preferably, a rich text field) enables the user to link email messages (typically, a database record) and/or any other type of database file, view, folder, calendar entry, to-do item, etc. to the document profile. No other document management system allows for this type of relationship/linking between the document profile of the document being created and other types of documents or files that are associated with, for example, a matter and/or project.

Other document management systems require the user to organize separate document profiles into folders and do not allow for other, external file types to be linked to the document profile.

A create document button 475 is preferably provided on document profile screen 400 to launch or invoke the application specified in type field 425 and creates a file in the operating system based on the predefined system variables that were selected by the administrator upon setup of the database. The document management system of the present invention is the only document management system that automatically passes the unique document identifier, the title and the author to the external application upon document creation. Other document management systems assign a temp file number and require the user to save the file and then return to the document management system to obtain the unique document identifier.

Although optimized for 32-bit applications, the document management system of the present invention is preferably not limited to 32-bit applications. The document management system can preferably launch any type of file format. A number of other document management systems do not allow 16-bit applications to be integrated into the system.

The details of four forms (Client/Matter, Document Profile, Document Template and Library) and script associated therewith of one embodiment of the present invention are set forth in the Appendix hereto.

Although the present invention has been described in detail in connection with the above examples, it is to be understood that such detail is solely for that purpose and that variations can be made by those skilled in the art without departing from the spirit of the invention except as it may be limited by the following claims.

APPENDIX

| Form Information | |
|---|---|
| Name: | Client-Matter |
| Last Modification: | |
| Comment: | CM |
| Type: | Document |
| Include in Compose Menu: | Yes |
| Include in Query by Form: | Yes |
| Default Database Form: | No |
| Automatically Refresh Fields: | No |
| Mail New Documents When Saving: | No |
| Store Form In Documents: | No |
| Inherit Default Field Values: | Yes |
| Updates Become Responses: | No |
| Retain Prior Versions As Responses: | No |
| Activate Objects When Composing: | No |
| Activate Objects When Editing: | No |
| Activate Objects When Reading: | No |
| Document Encryption Keys: | [None Assigned] |
| Composed Documents May Be Read By: | All Users |
| Form May Be Composed By: | All Users |
| Subcomponents: | |
| Field: | Client |
| Datatype: | Text |
| Input Multi-Value Separator(s): | Comma, Semicolon, New Line |
| Display Multi-Value Separator: | New Line |
| Help Description: | [Not Assigned] |
| Field Type: | Editable |
| Sign When Mailing/In Section: | No |
| Encryption: | Disabled |
| Update Requires Editor Access: | No |
| Default Value Formula: | Client |
| Is Scripted: | No |
| Field: | ClientNumber |

APPENDIX-continued

| Form Information | |
|---|---|
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Default Value Formula: | ClientNumber |
| Is Scripted: | No |
| Field: | Matter |
| Datatype: | Text |
| Input Multi-Value Separator(s): | Comma, Semicolon, New Line |
| Display Multi-Value Separator: | New Line |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | MatterNumber |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| JavaScript & HTML Code: | |
| [None] | |
| LotusScript Code: | |
| [None] | |
| Name: | Document Profile |
| Alias: | DP |
| Last Modification: | |
| Comment: | represents a document |
| Type: | Document |
| Include in Compose Menu: | Yes |
| Include in Query by Form: | Yes |
| Default Database Form: | Yes |
| Automatically Refresh Fields: | No |
| Mail New Documents When Saving: | No |
| Store Form In Documents: | No |
| Inherit Default Field Values: | No |
| Updates Become Responses: | No |
| Retain Prior Versions As Responses: | No |
| Activate Objects When Composing: | No |
| Activate Objects When Editing: | No |
| Activate Objects When Reading: | No |
| Document Encryption Keys: | [None Assigned] |
| Composed Documents May Be Read By: | All Users |
| Form May Be Composed By: | All Users |
| Subcomponents: | |
| Field: | DispDocNo |
| Datatype: | Text |
| Input Multi-Value Separator(s): | Comma, Semicolon |
| Display Multi-Value Separator: | Semicolon |
| Help Description: | [Not Assigned] |
| Field Type: | Computed for display |
| Sign When Mailing/In Section: | No |
| Encryption: | Disabled |
| Update Requires Editor Access: | No |
| Formula: | DocumentNo |
| Is Scripted: | No |
| Field: | Library |
| Datatype: | Keywords |
| Help Description: | [Not Assigned] |
| Field Type: | Editable |
| Keyword User Interface: | Standard |
| Allow Values Not In List: | No |
| Allowable Keywords Formula: | @DbColumn(""; ""; " Library"; 1); |
| Sign When Mailing/In Section: | No |
| Encryption: | Disabled |
| Update Requires Editor Access: | No |
| Is Scripted: | No |
| Field: | DispLibrary |
| Datatype: | Text |

APPENDIX-continued

| Form Information | |
|---|---|
| Help Description: | [Not Assigned] |
| Field Type: | Computed for display |
| Sign When Mailing/In Section: | No |
| Encryption: | Disabled |
| Update Requires Editor Access: | No |
| Formula: | Library |
| Is Scripted: | No |
| Field: | Author |
| Datatype: | Names |
| Input Multi-Value Separator(s): | Comma |
| Display Multi-Value Separator: | Comma |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | DocName |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | DocType |
| Datatype: | Keywords |
| Help Description: | [Not Assigned] |
| Field Type: | Editable |
| Keyword User Interface: | Standard |
| Allow Values Not In List: | No |
| Allowable Keywords Formula: | @DbColumn("Notes" "NoCache"; ""; "Templates"; 1); |
| Sign When Mailing/In Section: | No |
| Encryption : | Disabled |
| Update Requires Editor Access: | No |
| Is Scripted: | Yes |
| Field: | Client |
| Datatype: | Keywords |
| Help Description: | [Not Assigned] |
| Field Type: | Editable |
| Keyword User Interface: | Standard |
| Allow Values Not In List: | No |
| Allowable Keywords Formula: | @DbColumn("Notes" "NoCache"; ""; "CMLU"; 1); |
| Sign When Mailing/In Section: | No |
| Encryption: | Disabled |
| Update Requires Editor Access: | No |
| Is Scripted: | Yes |
| Field: | ClientNumber |
| Datatype: | Keywords |
| Help Description: | [Not Assigned] |
| Field Type: | Editable |
| Keyword User Interface: | Standard |
| Allow Values Not In List: | No |
| Allowable Keywords Formula: | @DbColumn("Notes" "NoCache"; ""; "CMLUBN"; 1); |
| Sign When Mailing/In Section: | No |
| Encryption: | Disabled |
| Update Requires Editor Access: | No |
| Is Scripted: | Yes |
| Field: | Matter |
| Datatype: | Keywords |
| Help Description: | [Not Assigned] |
| Field Type: | Editable |
| Keyword User Interface: | Standard |
| Allow Values Not In List: | No |
| Allowable Keywords Formula: | @DbLookup("Notes" : "NoCache"; ""; "CMLU"; Client; 2); |
| Sign When Mailing/In Section: | No |
| Encryption : | Disabled |
| Update Requires Editor Access: | No |
| Is Scripted: | Yes |
| Field: | MatterNumber |
| Datatype: | Keywords |
| Help Description: | [Not Assigned] |

APPENDIX-continued

| Form Information | |
|---|---|
| Field Type: | Editable |
| Keyword User Interface: | Standard |
| Allow Values Not In List: | No |
| Allowable Keywords Formula: | @DbLookup("Notes" : "NoCache"; ""; "CMLUBN"; ClientNumber; 2); |
| Sign When Mailing/In Section: | No |
| Encryption: | Disabled |
| Update Requires Editor Access: | No |
| Is Scripted: | Yes |
| Field: | DispClient |
| Datatype: | Text |
| Help Description: | [Not Assigned] |
| Field Type: | Computed for display |
| Sign When Mailing/In Section: | No |
| Encryption: | Disabled |
| Update Requires Editor Access: | No |
| Formula: | Client |
| Is Scripted: | No |
| Field: | DispClientNumber |
| Datatype: | Text |
| Help Description: | [Not Assigned] |
| Field Type: | Computed for display |
| Sign When Mailing/InSection: | No |
| Encryption: | Disabled |
| Update Requires Editor Access: | No |
| Formula: | ClientNumber |
| Is Scripted: | No |
| Field: | DispMatter |
| Datatype: | Text |
| Help Description: | [Not Assigned] |
| Field Type: | Computed for display |
| Sign When Mailing/InSection: | No |
| Encryption: | Disabled |
| Update Requires Editor Access: | No |
| Formula: | Matter |
| Is Scripted: | No |
| Field: | DispMatterNumber |
| Datatype: | Text |
| Help Description: | [Not Assigned] |
| Field Type: | Computed for display |
| Sign When Mailing/In Section: | No |
| Encryption: | Disabled |
| Update Requires Editor Access: | No |
| Formula: | MatterNumber |
| Is Scripted: | No |
| Field: | RestrictReadAccess |
| Datatype: | Reader Names |
| Input Multi-Value Separator(s): | Comma |
| Display Multi-Value Separator: | Comma |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | EnableEditByAuthors |
| Datatype: | Author Names |
| Input Multi-Value Separator(s): | Comma |
| Display Multi-Value | Comma |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | Comments |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Hotspot | |
| Type: | Button |
| Caption: | Create Document |

APPENDIX-continued

Form Information

| | |
|---|---|
| Is Scripted: | Yes, see below |
| Hotspot | |
| Type: | Button |
| Caption: | Create Document |
| Is Scripted: | Yes, see below |
| Field: | Body |
| Datatype: | Rich Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | EmailLink |
| Datatype: | Rich Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | DocumentNo |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | TemplatePath |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | ClientDocumentPath |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | ServerDocumentPath |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | URLDocumentPath |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | ComputedReader |
| Datatype: | Reader Names |
| Help Description: | [Not Assigned] |
| Field Type: | Computed when composed |
| Sign When Mailing/In Section: | No |
| Encryption: | Disabled |
| Update Requires Editor Access: | No |
| Formula: | @If(RestrictReadAccess ! = "" ; @UserName; ""); |
| Is Scripted: | No |
| Field: | CreatedBy |
| Datatype: | Author Names |
| Help Description: | [Not Assigned] |
| Field Type: | Computed when composed |
| Sign When Mailing/In Section: | No |
| Encryption: | Disabled |

APPENDIX-continued

| Form Information | |
|---|---|
| Update Requires Editor Access: | No |
| Formula: | @UserName |
| Is Scripted: | No |
| Field: | AppClassName |
| Datatype: | Text |
| Help Description: | [Not Assigned] |
| Field Type: | Editable |
| Sign When Mailing/In Section: | No |
| Encryption : | Disabled |
| Update Requires Editor Access: | No |
| Is Scripted: | No |
| Field: | BuiltinProperties |
| Datatype: | Text |
| Input Multi-Value Separator(s): | Comma, Semicolon |
| Display Multi-Value Separator: | Semicolon |
| Help Description: | [Not Assigned] |
| Field Type: | Editable |
| Sign When Mailing/In Section: | No |
| Encryption : | Disabled |
| Update Requires Editor Access: | No |
| Is Scripted: | No |
| Field: | CustomProperties |
| Datatype: | Text |
| Input Multi-Value Separator(s): | Comma, Semicolon |
| Display Multi-Value Separator: | Semicolon |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | CopyOption |
| Datatype: | Number |
| Number Format: | Fixed (0 Decimal Places) |
| Percentage (value * 100)%: | No |
| Parentheses on Negative Numbers: | No |
| Punctuated at Thousands: | No |
| Help Description: | [Not Assigned] |
| Field Type: | Editable |
| Sign When Mailing/In Section: | No |
| Encryption : | Disabled |
| Update Requires Editor Access: | No |
| Default Value Formula: | 0 |
| Is Scripted: | No |
| Action Exit\After Saving | |
| Formula: | @Command([FileSave]); |
|  | @Command([FileCloseWindow]); |
| Action Exit\Without Saving | |
| Formula: | FIELD SaveOptions : = 0; |
|  | @Command([FileCloseWindow]); |
| Action Profile\Edit | |
| Formula: | @Command([EditDocument]; |
|  | 1); |
| Action Profile\Edit | |
| Formula: | |
|  | @Command([EditDocument]); |
| Action Profile\Print | |
| Formula: | @Command([FilePrint]); |
| Action Profile\Print | |
| Formula: | @Command([FilePrint]); |
| Action Profile\View | |
| Formula: | @Command([EditDocument]; |
|  | 0); |
| Action Document\Download | |
| Formula: | @URLOpen(URLDocumentPath; |
| Action Mail\Switch to Notes | |
| Formula: | @Command([MailOpen]); |
| JavaScript & HTML Code: | |
|     [None] | |
| LotusScriptCode: | |

```
  (Globals)
    Option Public
    Use "AppProcedures"
    ' these declarations are for determining whether
    ' client or matter numbers have been changed from those obtained
    ' in a lookup operation . . .
    Dim ClientNumberFromLookup As String
```

APPENDIX-continued

Form Information

```
    Dim MatterNumberFromLookup As String
    ' these are used to determine if the user has changed the Client fields . . .
    ' values are set in post-open . . .
    ' and tested in the Exiting events of Client and ClientNumber . . .
    Dim ExistingClient As String
    Dim ExistingClientNumber As String
    Dim CheckedOutThisSession As Integer
    Sub Initialize
    End Sub
  (Form) DP
    Sub Postopen(Source As Notesuidocument)
        Dim session As New notessession
        Set db = session.currentdatabase
        Dim sourcedoc As notesdocument
        Set sourcedoc = source.document
        Dim lockdoc As notesdocument
        Dim coll As notesdocumentcollection
If source.IsNewDoc Then
' we're going to get counter from a profile document kept on a per- user basis . . .
  Set profile = db.getprofiledocument("NumberKeeper", session.username)
  tmpInitials = profile.Initials(0)
  If tmpInitials ="" Then
     tmpInitials = Inputbox$("Enter your login initials: ")
     profile.Initials = tmpInitials
  End If
  Dim tmpNumber As Integer
  Dim numberitem As notesitem
  Set numberitem = profile.GetFirstItem("DocNumber")
  If numberitem Is Nothing Then
     tmpNumber = 0
  Else
     tmpNumber = numberitem.values(0)
  End If
  tmpNumber = tmpNumber+ 1 ' new value is 1 greater than previous value
  profile.DocNumber = tmpNumber
  Call profile.save(True, True)
  tmpNumberString = tmpInitials + Trim(Str(tmpNumber))
  Call source.FieldSetText("DocumentNo",tmpNumberString)
  Call source.save
  CheckedOutThisSession = True
  Set sourcedoc = source.document
  Set lockdoc =db.CreateDocument
  lockdoc.form = "LockAndLog"
  lockdoc.CheckOutName = session.commonusername
  lockdoc.CheckOutTime = Now
  lockdoc.Log = "Created by" + session.commonusername +" on " + Format(Now,"General Date")
  lockdoc.DocumentNo = tmpNumberString
  Call lockdoc. makeresponse(sourcedoc)
  Call lockdoc.save(True, True)
Else ' here's the check-out stuff (which doesn't need to happen with a new doc)
  If source.editmode Then ' document opened in edit mode . . .
     username = session.commonusername
     Set sourcedoc = source.document
     Set coll = sourcedoc.Responses
     If (coll Is Nothing) Or (coll.count = 0) Then ' no response doc; we have to create one . . .
        Set lockdoc = db.CreateDocument
        lockdoc.form = "LockAndLog"
        lockdoc.CheckOutName =session.commonusername
        lockdoc.CheckOutTime = Now
        lockdoc.Log = "Created by" + session.commonusername + " on " + Format(Now,
        "General Date")
        lockdoc. DocumentNo = sourcedoc.DocumentNo(0)
        Call lockdoc.makeresponse(sourcedoc)
        Call lockdoc.save(True, True)
        CheckedOutThisSession = True
     Else ' we did find the response document . . .
        Set lockdoc = coll.getfirstdocument
        CheckOutName = lockdoc.CheckOutName(0)
        If Not (CheckOutName ="") Then ' is checked out . . .
           If username =CheckOutName Then ' was already checked out to this user
              CheckedOutThisSession = True ' want to prompt for checkin . . .
           Else ' was checked out to someone else . . .
              Msgbox("Can't edit this; already checked out to " + CheckOutName + ". Will open
              in read-only mode."
                 source.editmode = False
              End If
           Else ' not checked out; so we check it out to this user . . .
```

APPENDIX-continued

Form Information

```
            lockdoc.CheckOutName = session.commonusername
            lockdoc.CheckOutTime = Now
            lockdoc.log = lockdoc.log(0) + Chr$(10) + "Checked out by" +
            session.commonusername
            Call lockdoc.save(True, True) ' save it
            CheckedOutThisSession = True
         End If
      End If
   Else ' document opened in readmode . . .
' can't think of anything that needs to be done . . .
      End If
   End If
   ExistingClient = sourcedoc.Client(0)
   ExistingMatter = sourcedoc.Matter(0)
End Sub
Sub Querymodechange(Source As Notesuidocument, Continue As Variant)
   If source.editmode Then ' currently in edit mode, changing to read mode . . .
' nothing to do . . . ?
   Else ' changing to edit mode, from read-mode; do check out routine . . .
      Dim session As New notessession
      username = session.commonusername
      Set sourcedoc = source.document
      Set coll = sourcedoc.Responses
      Set lockdoc = coll.getfirstdocument
      CheckOutName = 1 lockdoc.CheckOutName(0)
      If Not (CheckOutName = "") Then ' is checked out . . .
   If username = CheckOutName Then ' was already checked out to this user
' nothing to do here . . .
         Else ' was checked out to someone else . . .
            Msgbox("Can't edit this; already checked out to" + CheckOutName + ". Will open
            in read-only mode."
            source.editmode = False
         End If
      Else ' not checked out; so we check it out to this user . . .
         lockdoc.CheckOutName =session.commonusername
         lockdoc.CheckOutTime = Now
         lockdoc.log = lockdoc.log(0) + Chr$(10) + "Checked out by" +
         session.commonusername
         Call lockdoc.save(True, True) , save it
         CheckedOutThisSession = True
      End If
      ExistingClient =sourcedoc.Client(0)
      Existing Matter = sourcedoc.Matter(0)
   End If
End Sub
Sub Querysave(Source As Notesuidocument, Continue As Variant)
   If (CheckedOutThisSession ) Then
      reply =Msgbox("Are you through editing this Document?", 36, "Check in?")
      If reply = 6 Then ' YES
'Call source. FieldSetText("CheckOutName", "")
         Dim session As New notessession
         Dim sourcedoc As notesdocument
         Dim lockdoc As notesdocument
         Dim coll As notesdocumentcollection
         Set sourcedoc = source.document
         Set coil = sourcedoc. responses
         Set lockdoc = coll.getfirstdocument
         lockdoc.CheckOutName = ""
         lockdoc.Log = lockdoc.Log(0) + Chr$(10) + Checked in by" +
         session.commonusername
         Call lockdoc.save(True, True)
         CheckedOutThisSession = False
      End If
   End If
End Sub
Sub Queryclose(Source As Notesuidocument, Continue As Variant)
   If (CheckedOutihisSession) Then ' (used to have this condition also; caused two check-in dialog
   boxes: Or (source.editmode) Thenreply = Msgbox("Are you through editing this
   Document?", 36, "Check in?")
      If reply = 6 Then ' YES
'Call source.FieldSetText("CheckOutName", "")
         Dim session As New notessession
         Dim sourcedoc As notesdocument
         Dim lockdoc As notesdocument
         Dim coil As notesdocumentcollection
         Set sourcedoc = source.document
         Set coll = sourcedoc.responses
```

APPENDIX-continued

Form Information

```
            Set lockdoc = coll.getfirstdocument
            lockdoc.CheckOutName =""
            lockdoc.Log = lockdoc.Log(0) + Chr$(10) + "Checked in by" +
            session.commonusername
            Call lockdoc.save(True, True)
            CheckedOutThisSession = False
        End If
    End If
End Sub
(Field) MatterNumber
    Sub Exiting(Source As Field)
        Dim uiwork As New notesuiworkspace
        Dim uidoc As notesuidocument
        Set uidoc = uiwork.currentdocument
        tmpMatterNumber = uidoc.FieldGetText("MatterNumber")
        If tmpMatterNumber = MatterNumberFromLookup Then
            ' do nothing
        Else
            ' re-set the Client field, to reflect the value of the new Client Number
            Dim s As New notessession
            Dim db As notesdatabase
            Set db =s.currentdatabase
            Dim view As notesview
            Set view = db.GetView("CMLUBN")
            Dim doc As notesdocument
            Dim key(1) As String
            key(0) = Trim(uidoc.FieldGetText("ClientNumber"))
            key(1) =Trim(tmpMatterNumber)
            Set doc = view.GetDocumentByKey(key)
            tmpMatter = doc. Matter(0)
            Call uidoc.fieldsettext("Matter", tmpMatter)
            Call uidoc.refresh
        End If
    End Sub
(Field) Matter
    Sub Exiting(Source As Field)
        Dim uiwork As New notesuiworkspace
        Dim uidoc As notesuidocument
        Set uidoc = uiwork.currentdocument
        tmpClient = uidoc.FieldGetText("Client")
        tmpMatter = uidoc.FieldGetText("Matter")
        If Not tmpClient = "" Then
            if Not tmpMatter = "" Then
                Dim s As New notessession
                Dim db As notesdatabase
                Set db = s.currentdatabase
                Dim view As notesview
                Set view = db.GetView("CMLU")
                Dim doc As notesdocument
                Dim key(1) As String
                key(0) = tmpClient
                key(1) = tmpMatter
                Set doc = view.getdocumentbykey(key)
                Dim tmpMatterNumber As String
                tmpMatterNumber = doc.MatterNumber(0)
                Call uidoc.fieldsettext("MatterNumber", tmpMatterNumber)
                Call uidoc.refresh
                MatterNumberFromLookup = tmpMatterNumber
                Call uidoc.GoToField("RestrictReadAccess")
            End If
        End If
    End Sub
(Field) ClientNumber
    Sub Exiting(Source As Field)
        Dim uiwork As New notesuiworkspace
        Dim uidoc As notesuidocument
        Set uidoc = uiwork.currentdocument
        tmpClientNumber = Trim(uidoc.FieldGetText("ClientNumber"))
        If tmpClientNumber = ClientNumberFromLookup Then
            ' do nothing
        Else
            ' re•set the Client field, to reflect the value of the new Client Number
            Dim s As New notessession
            Dim db As notesdatabase
            Set db = s.currentdatabase
            Dim view As notesview
            Set view = db.GetView("CMLUBN")
```

APPENDIX-continued

Form Information

```
        Dim doc As notesdocument
        Set doc = view.GetDocumentByKey(tmpClientNumber)
        tmpClient = Trim(doc.Client(0))
        Call uidoc.fieldsettext("Client", tmpClient)
        If Not tmpClientNumber = ExistingClientNumber Then ' user has changed the client•number,
            ' so we're gonna blank out the Matter fields (no longer valid choices) . . .
            Call uidoc.FieldSetText("Matter","")
            Call uidoc.FieldSetText("MatterNumber","")
            ExistingClientNumber = tmpClientNumber ' reset
        End If
        Call uidoc.refresh
    End If
End Sub
(Field) Client
    Sub Exiting(Source As Field)
        Dim uiwork As New notesuiworkspace
        Dim uidoc As notesuidocument
        Set uidoc = uiwork.currentdocument
        Dim tmpClientNumber As String
        tmpClient = Trim(uidoc.FieldGetText("Client"))
        If Not tmpClient = "" Then
            Dim s As New notessession
            Dim db As notesdatabase
            Set db =s.currentdatabase
            Dim view As notesview
            Set view =db.GetView("CMLU")
            Dim doc As notesdocument
            Set doc = view.getdocumentbykey(tmpClient)
            tmpClientNumber =Trim(doc.ClientNumber(0))
            Call uidoc.fieldsettext("ClientNumber", tmpClientNumber)
            ClientNumberFromLookup =tmpClientNumber
            If Not tmpClient = ExistingClient Then ' user has changed the client . . .
                ' so we're gonna blank out the Matter fields (no longer valid choices) . . .
                Call uidoc.FieldSetText("Matter","")
                Call uidoc.FieldSetText("MatterNumber","")
                ExistingClient = tmpClient ' reset, so this doesn't happen again, until changed again . .
            End If
            ' not sure if we need to do these things, so comment out for testing . . .
            'Call uidoc.refresh
            Call uidoc.gotofield("Matter")
        End If
    End Sub
(Field) DocType
    Sub Exiting(Source As Field)
        Dim session As New notessession
        Dim uiwork As New notesuiworkspace
        Set uidoc = uiwork.currentdocument
        Set db = session.currentdatabase
        Set view =db.getview("Templates")
        tmpTemplate = uidoc. FieldGetText("DocType")
        Set doc = view.GetDocumentByKey(tmpTemplate)
        tmp TemplatePath = doc.Path(0)
        Call uidoc. FieldSetText("TemplatePath", tmpTemplatePath)
        tmpAppClassName = doc.AppClassName(0)
        Call uidoc.FieldSetText("AppClassName", tmpAppClassName)
        ' commented these out because of type mismatch; need to deal with arrays here
    ' tmpBuiltinProperties = doc.BuiltinProperties
    ' Call uidoc.fieldsettext("BuiltinProperties", tmpBuiltinProperties)
    ' tmpcustomProperties =doc.CustomProperties
    ' Call uidoc.fieldsettext("CustomProperties", tmpCustomProperties)
    End Sub
(Button) Create Document
    Sub Click(Source As Button)
        ' check that all required fields have values . . .
        Dim uiwork As New notesuiworkspace
        Dim doc As notesdocument
        Set uidoc = uiwork.currentdocument
    Set doc = uidoc.document
    tmpDocName = uidoc.FieldGetText("DocName")
    tmpDocType = uidoc.FieldGetText("DocType")
    tmpClient = uidoc.FieldGetText("Client")
    tmpMatter = uidoc.FieldGetText("Matter")
    If ((tmpDocName = "") Or (tmpDocType = "") Or (tmpClient = "") Or (tmpMatter = "")) Then
        Msgbox "Document title, type, client and matter are REQUIRED fields. Please fill them in
        before creating a document."
        End
    Else
```

APPENDIX-continued

Form Information

```
    Dim session As New notessession
    Set db = session.currentdatabase
    Set profiledoc = db.GetProfileDocument("SystemProfile")
    templatePrefix = profiledoc.ClientTemplatePrefix(0)
    documentPrefix = profiledoc.DocPathClient(0)
    templatePath = templatePrefix + uidoc.fieldgettext("TemplatePath")
    exists = Dir(templatePath)
    If exists = "" Then ' not found
        Msgbox "Template not found"
    Else
        subdirType = profiledoc.Path Type(0)
        Select Case subdirType
        Case "CNMN"
            subdirLevelOne = uidoc.fieldgettext("Client")
            subdirLevelTwo = uidoc.fieldgettext("Matter")
        Case "AT"
            tmpName$ = uidoc.fieldgettext("Author")
            Set nn = New notesname(tmpName$)
            subdirLevelOne = nn.common
            subdirLevelTwo = uidoc.fieldgettext("DocType")
        Case "CMDT"
            subdirLevelOne = uidoc.fieldgettext("Client")+" . " + uidoc.fieldgettext("Matter")
            subdirLevelTwo = uidoc.fieldgettext("DocType")
        End Select
        extension = Right(templatePath, 4)
        documentPath = documentPrefix
        exists = Dir(documentPath, 16)
        If exists = "" Then
            Mkdir documentPath
        End If
        documentPath = documentPath + subdirLevelOne
        exists = Dir(documentPath, 16)
        If exists ="" Then
            Mkdir documentpath
        End If
        documentpath = documentPath + "\" + subdirLevelTwo
        exists = Dir(documentPath, 16)
        If exists = "" Then
            Mkdir documentPath
        End If
        tmpDocumentNo = uidoc.fieldgettext("DocumentNo")
        documentPath = documentpath + "\" + tmpDocumentNo + extension
        ' copy the template document into the documents
        Filecopy templatePath, documentPath
        exists = Dir(documentPath)
        If Not exists = "" Then
            ' set 3 hidden fields:
            ' 1 . for ClientDocumentPath
            ' 2 . for ServerDocumentPath
            ' 3 . for URLDocumentPath
            Call uidoc-fieldsetText("ClientDocumentPath", documentpath)
            ServerDocPath =profiledoc.DocPathServer(0) + subdirLevelOne + "\" + subdirLevelTwo
            Call uidoc.fieldsetText("ServerDocumentpath",ServerDocpath)
            tmpLibrary = uidoc.fieldgettext("Library")
            Set view =db.GetView("Library")
            Set libdoc =view.GetDocumentByKey(tmpLibrary)
            URLPrefix = libdoc.URLPrefix(0)
            URLDocPath = URLprefix + subdirLevelOne + "\" + subdirLevelTwo + "\" + tmpDoc
            Call uidoc.fieldsetText("URLDocumentpath", URLDocPath)
            Call uidoc.refresh
            CheckedOutThisSession = False
            Call uidoc.save
            CheckedOutThisSession = True
            c here's where we launch into an edit session
            Call EditAppDoc(documentpath, False, doc)
        Else
            Msgbox "Failed to create document"
        End If
    End If
End If
End Sub
(Button) Create Document
Sub Click(Source As Button)
    ' check that all required fields have values . . .
    Dim uiwork As New notesuiworkspace
```

APPENDIX-continued

| Form Information |
|---|

```
Dim doc As notesdocument
Set uidoc = uiwork.currentdocument
Set doc = uidoc.document
tmpDocName = uidoc.FieldGetText("DocName")
tmpDocType = uidoc.FieldGetText("DocType")
tmpClient = uidoc.FieldGetTex("Client")
tmpMatter = uidoc.FieldGetText("Matter")
If ((tmpDocName = "") Or (tmpDocType = "") Or (tmpClient = "") Or (tmpMatter = ""))
Then
   Msgbox "Document title, type, client and matter are REQUIRED fields. Please fill them
in before creating a document."
   End
Else
   Dim session As New notessession
   Set db = session.currentdatabase
   Set profiledoc = db.GetProfileDocument("SystemProfile")
   templatePrefix = profiledoc.ClientTemplatePrefix(0)
   documentPrefix = profiledoc.DocPathClient(0)
   templatePath = templatePrefix + uidoc.fieldgettext("TemplatePath")
   exists = Dir(templatePath)
   If exists ="" Then ' not found
      Msgbox "Template not found"
   Else
   subdirType = profiledoc.PathType(0)
   If subdirType = "CNMN" Then
      subdirLevelOne = uidoc.fieldgettextCClient")
      subdirLevelTwo = uidoc.fieldgettext("Matter")
   Else
      subdirLevelOne = uidoc.fieldgeltext("Author")
      subdirLevelTwo = uidoc. fieldgeltext("DocType")
   End If
   documentPath = documentprefix
   exists =Dir(documentPath, 16)
   If exists = "" Then
      Mkdir documentPath
   End If
   documentPath =documentPath + subdirLevelOne
   exists = Dir(documentPath, 16)
   If exists = "" Then
      Mkdir documentpath
   End If
   documentPath = documentPath + "\" + subdirLevelTwo
   exists = Dir(documentPath, 16)
   If exists = " Then
      Mkdir documentPath
   End If
   tmpDocumentNo = uidoc.fieldgeltext("DocumentNo")
   tmpModelDoc = doc.CopyDocFrom(0)
   extension = Right(tmpModelDoc, 4)
   documentPath = documentPath + "\" + tmpDocumentNo + extension
   ' **************
   ' copy the model document into the documents
   exists = Dir(tmpModelDoc)
   If exists = "" Then
      Msgbox "Model document not found: "+ tmpModelDoc
      End
   End If
   Filecopy tmpModelDoc, documentPath
   exists = Dir(documentPath)
   If Not exists = "" Then
      ' set 3 hidden fields:
         ' 1 . for ClientDocumentPath
         ' 2 . for ServerDocumentPath
         ' 3 . for URLDocumentPath
      Call uidoc. fieldsetText("ClientDocumentPath", documentPath)
      ServerDocPath = profiledoc.DocPathServer(0) + subdirLevelOne + "\" +
      subdirLevelTwo,
      Call uidoc.fieldsetText("ServerDocumentpath",ServerDocPath)
      tmpLibrary = uidoc.fieldgeltext("Library")
      Set view = db.GetView("Library")
      Set libdoc = view.GetDocumentByKey(tmpLibrary)
      URLPrefix = libdoc.URLPrefix(0)
      URLDocPath = URLprefix + subdirLevelOne +"\" + subdirLevelTwo +"\" +
      tmpDocument
      Call uidoc.fieldsetText("URLDocumentpath", URLDocPath)
      CheckedOutThisSession = False
      Call uidoc. refresh
```

APPENDIX-continued

Form Information

```
        Call uidoc.save
        CheckedOutThisSession = True
' (already done)        Set doc = uidoc.document
            ' here's where we launch into an edit session
        Call EditAppDoc(documentpath, False, doc)
      Else
        Msgbox "Failed to create document."
      End If
'     End If
    End If
  End Sub
(Action) Document\Edit
  Sub Click(Source As Button)
    Dim uiwork As New notesuiworkspace
    Dim session As New notessession
    Set uidoc = uiwork.currentdocument
    Dim doc As notesdocument
    Set doc = uidoc.document
    Dim obj As Variant
    Dim filename As Variant
    filename = ildoc.FieldGetText("ClientDocumentPath")
    Call EditAppDoc(filename, False, doc)
  End Sub
(Action) Document\Print
  Sub Click(Source As Button)
    Dim uiwork As New notesuiworkspace
    Set uidoc = uiwork.currentdocument
    Dim doc As notesdocument
    Set doc = uidoc.document
    Dim filename As Variant
    filename = uidoc.FieldGetText("ClientDocumentPath")
    Call PrintAppDoc(filename, doc)
  End Sub
(Action) Document\ View
  Sub Click(Source As Button)
    Dim uiwork As New notesuiworkspace
    Dim session As New notessession
    Set uidoc = uiwork.currentdocument
    Dim doc As notesdocument
    Set doc = uidoc.document
    Dim obj As Variant
    Dim filename As Variant
    filename = uidoc.FieldGetText("ClientDocumentPath")
    Call EditAppDoc(filename, True, doc)
  End Sub
(Action) Mail\Link to Document
  Sub Click(Source As Button)
    Dim ws As New notesuiworkspace
    Set uidoc = ws.currentdocument
    Dim doc As notesdocument
    Set doc = uidoc.document
    Call MailLink(doc)
  End Sub
(Action) Mail\Copy of Document
  Sub Click(Source As Button)
    Dim ws As New notesuiworkspace
    Set uidoc = ws.currentdocument
    Dim doc As notesdocument
    Set doc = uidoc.document
    Call MailLink(doc)
  End Sub
```

| | |
|---|---|
| Name: | Document Template |
| Alias: | Tmp |
| Last Modification: | |
| Comment: | Stores document templates |
| Type: | Document |
| Include in Compose Menu: | Yes |
| Include in Query by Form: | Yes |
| Default Database Form: | No |
| Automatically Refresh Fields: | No |
| Mail New Documents When Saving: | No |
| Store Form In Documents: | No |
| Inherit Default Field Values: | Yes |
| Updates Become Responses: | No |
| Retain Prior Versions As Responses: | No |
| Activate Objects When Composing: | No |
| Activate Objects When Editing: | No |

APPENDIX-continued

| Form Information | |
|---|---|
| Activate Objects When Reading: | No |
| Document Encryption Keys: | [None Assigned] |
| Composed Documents May Be Read By: | All Users |
| Form May Be Composed By: | All Users |
| Subcomponents: | |
| Field: | Name |
| Datatype: | Text |
| Help Description: | [Not Assigned) |
| Field Type: | Editable |
| Sign When Mailing/In Section: | No |
| Encryption: | Disabled |
| Update Requires Editor Access: | No |
| Is Scripted: | No |
| Field: | Path |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | AppClassName |
| Datatype: | Keywords |
| Help Description: | [Not Assigned] |
| Field Type: | Editable |
| Keyword User Interface: | Standard |
| Allow Values Not In List: | No |
| Allowable Keywords: | Excel |
| | Lotus 1-2-3 |
| | PowerPoint |
| | Word |
| | WordPerfect |
| Sign When Mailing/In Section: | No |
| Encryption: | Disabled |
| Update Requires Editor Access: | No |
| Is Scripted: | No |
| Field: | BuiltinProperties |
| Datatype: | Keywords |
| Input Multi-Value Separator(s): | Comma |
| Display Multi-Value Separator: | Comma |
| Help Description: | [Not Assigned] |
| Field Type: | Editable |
| Keyword User Interface: | Standard |
| Allow Values Not In List: | No |
| Allowable Keywords: | Title |
| | Subject |
| | Author |
| | Keywords |
| | Comments |
| | Template |
| | Last Author |
| | Revision Number |
| | Category |
| | Format |
| | Manager |
| | Company |
| Sign When Mailing/In Section: | No |
| Encryption: | Disabled |
| Update Requires Editor Access: | No |
| Is Scripted: | No |
| Field: | Custom Properties |
| Datatype: | Keywords |
| Input Multi-Value Separator(s) | Comma |
| Display Multi-Value Separator: | Comma |
| Help Description: | [Not Assigned] |
| Field Type: | Editable |
| Keyword User Interface: | Standard |
| Allow Values Not In List: | Yes |
| Sign When Mailing/In Section: | No |
| Encryption: | Disabled |
| Update Requires Editor Access: | No |
| Default Value Formula: | CustomProperties |
| Is Scripted: | No |
| JavaScript & HTML Code: | |
| [None] | |

APPENDIX-continued

| Form Information | |
|---|---|
| LotusScript Code: | |
| [None] | |
| Name: | Library |
| Last Modification: | |
| Comment: | [Not Assigned] |
| Type: | Document |
| Include in Compose Menu: | Yes |
| Include in Query by Form: | Yes |
| Default Database Form: | No |
| Automatically Refresh Fields: | No |
| Mail New Documents When Saving: | No |
| Store Form In Documents: | No |
| Inherit Default Field Values: | No |
| Updates Become Responses: | No |
| Retain Prior Versions As Responses: | No |
| Activate Objects When Composing: | No |
| Activate Objects When Editing: | No |
| Activate Objects When Reading: | No |
| Document Encryption Keys: | [None Assigned] |
| Composed Documents May Be Read By: | All Users |
| Form May Be Composed By: | All Users |
| Subcomponents: | |
| Field: | Library |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | URLPrefix |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| JavaScript & HTML Code: | |
| [None] | |
| LotusScript Code: | |
| [None] | |
| Name: | LockAndLog |
| Last Modification: | |
| Comment: | for record locking and log |
| Type: | Response to Document |
| Include in Compose Menu: | No |
| Include in Query by Form: | Yes |
| Default Database Form: | No |
| Automatically Refresh Fields: | No |
| Mail New Documents When Saving: | No |
| Store Form In Documents: | No |
| Inherit Default Field Values: | No |
| Updates Become Responses: | No |
| Retain Prior Versions As Responses: | No |
| Activate Objects When Composing: | No |
| Activate Objects When Editing: | No |
| Activate Objects When Reading: | No |
| Document Encryption Keys: | [None Assigned] |
| Composed Documents May Be Read By: | All Users |
| Form May Be Composed By: | All Users |
| Subcomponents: | |
| Field: | CheckOutName |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | CheckOutTime |
| Datatype: | Time |
| Time Format: | 05/13/99 |
| Help Description: | [Not Assigned] |
| Field Type: | Editable |

APPENDIX-continued

| Form Information | |
|---|---|
| Sign When Mailing/In Section: | No |
| Encryption: | Disabled |
| Update Requires Editor Access: | No |
| Is Scripted: | No |
| Field: | Log |
| Datatype: | Text |
| Help Description: | [Not Assigned] |
| Field Type: | Editable |
| Sign When Mailing/In Section: | No |
| Encryption : | Disabled |
| Update Requires Editor Access: | No |
| Is Scripted: | No |
| Field: | DocumentNo |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| JavaScript & HTML Code: | |
| [None] | |
| LotusScript Code: | |
| [None] | |
| Name: | SoftSolutions |
| Last Modification: | |
| Comment: | [Not Assigned] |
| Type: | Document |
| Window Title Formula: | "SoftSolutions Converted Documents" |
| Include in Compose Menu: | Yes |
| Include in Query by Form: | Yes |
| Default Database Form: | No |
| Automatically Refresh Fields: | No |
| Mail New Documents When Saving: | No |
| Store Form In Documents: | No |
| Inherit Default Field Values: | No |
| Updates Become Responses: | No |
| Retain Prior Versions As Responses: | No |
| Activate Objects When Composing: | No |
| Activate Objects When Editing: | Yes, Show Notes Document |
| Activate Objects When Reading: | Yes, Show Notes Document |
| Document Encryption Keys: | [None Assigned] |
| Composed Documents May Be Read By: | All Users |
| Form May Be Composed By: | All Users |
| Subcomponents: | |
| Field: | DocumentNo |
| Datatype: | Number |
| Number Format: | General |
| Percentage (value * 100)%: | No |
| Parentheses on Negative Numbers: | No |
| Punctuated at Thousands: | No |
| Help Description: | SofSolutions Number |
| Field Type: | Editable |
| Sign When Mailing/In Section: | No |
| Encryption: | Disabled |
| Update Requires Editor Access: | No |
| Is Scripted: | No |
| Field: | DocName |
| Datatype: | Text |
| Help Description: | SoftSolutions Document Name |
| Field Type: | Editable |
| Sign When Mailing/In Section: | No |
| Encryption: | Disabled |
| Update Requires Editor Access: | No |
| Is Scripted: | No |
| Field: | AuthorDescription |
| Datatype: | Keywords |
| Input Multi-Value Separator(s): | Comma |
| Display Multi-Value Separator: | Comma |
| Help Description: | SoftSolutions Author Name |
| Field Type: | Editable |
| Keyword User Interface: | Standard |
| Allow Values Not In List: | Yes |
| Sign When Mailing/In Section: | No |

APPENDIX-continued

| Form Information | |
|---|---|
| Encryption : | Disabled |
| Update Requires Editor Access: | No |
| Is Scripted: | No |
| Field: | DocumentTypeCode |
| Datatype: | Keywords |
| Input Multi-Value Separator(s): | Comma |
| Display Multi-Value Separator: | Comma |
| Help Description: | SoftSolutions Document Type |
| Field Type: | Editable |
| Keyword User Interface: | Standard |
| Allow Values Not In List: | Yes |
| Allowable Keywords: | Agreement |
| | Brief |
| | Contract |
| | Correspondence |
| | Deposition |
| | Form |
| | Letter |
| | Memorandum |
| | Proposal |
| | Spreadsheet |
| Sign When Mailing/In Section: | No |
| Encryption: | Disabled |
| Update Requires Editor Access: | No |
| Is Scripted: | No |
| Field: | ClientDescription |
| Datatype: | Keywords |
| Input Multi-Value Separator(s): | Comma |
| Display Multi-Value Separator: | Comma |
| Help Description: | SoftSolutions Client Description |
| Field Type: | Editable |
| Keyword User Interface: | Standard |
| Allow Values Not In List: | Yes |
| Sign When Mailing/In Section: | No |
| Encryption: | Disabled |
| Update Requires Editor Access: | No |
| Default Value Formula: | @DbLookup(elite : son_db; matter; mname); |
| Is Scripted: | No |
| Field: | Security |
| Datatype: | Keywords |
| Input Multi-Value Separator(s): | Comma |
| Display Multi-Value Separator: | Comma |
| Help Description: | SoftSolutions Security Group |
| Field Type: | Editable |
| Keyword User Interface: | Standard |
| Allow Values Not In List: | Yes |
| Sign When Mailing/In Section: | No |
| Encryption : | Disabled |
| Update Requires Editor Access: | No |
| Is Scripted: | No |
| Field: | DateCreated |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | CreatedBy |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | DateOpened |
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | RevisedBy |

APPENDIX-continued

| Form Information | |
|---|---|
| Datatype: | Text |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Field: | DocPath |
| Datatype: | Text |
| Help Description: | Location of Document |
| Field Type: | Editable |
| Sign When Mailing/In Section: | No |
| Encryption: | Disabled |
| Update Requires Editor Access: | No |
| Is Scripted: | No |
| Field: | SSReaders |
| Datatype: | Reader Names |
| Help Description: | [Not Assigned] |
| Field Type: | Editable |
| Sign When Mailing/In Section: | No |
| Encryption: | Disabled |
| Update Requires Editor Access: | No |
| Is Scripted: | No |
| Action Save Profile | |
| Formula: | @Command([FileCloseWindow]); |
| Action Save Version | |
| Formula: | @Command([FileSaveNewVersion]); |
| Action Edit Document | |
| Formula: | @Command([Execute]; DocPath); |
| JavaScript & HTML Code: | |
| [None] | |
| LotusScript Code: | |
| [None] | |

What is claimed is:

1. A method for managing documents in a computer implemented document management system, comprising:

creating a document profile that comprises fields of attributes of a document for each of the documents;

generating a unique identifier for each of the documents, the unique identifier comprising at least a first portion including information descriptive of a distinguishing characteristic of the document and at least a second portion including an automatically generated number, the unique identifiers being viewable by users of the document management system so that a group of the unique identifiers comprising a common first portion can be identified by the common first portion and distinguished from other unique identifiers comprising a different first portion; and storing the document profile for each of the documents.

2. The method of claim 1 wherein the first portion is descriptive of the author of the document.

3. The method of claim 2 wherein the second portion is a sequentially generated number unique for the first portion.

4. The method of claim 2 wherein the unique identifier is generated before the document content is entered.

5. The method of claim 1 wherein the second portion is a sequentially generated number unique for the first portion.

6. The method of claim 1 further comprising requiring selection of a predefined document template from a set of predefined document templates for the document during creation of the document profile, the document template defining the format of the document and a software application to use for generation of the document.

7. The method of claim 1 further comprising creating a link in the document profile to a file type that is not created within the document management system.

8. The method of claim 1 further comprising creating an email message via a messaging system external to the document management system comprising a link to the document profile using a selector within the document management system so that a recipient of the message can access the document associated with the document profile if the recipient has appropriate authorization to access the document associated with the document profile.

9. The method of claim 1 further comprising creating an email message via a messaging system external to the document management system comprising a copy of the document using a selector within the document management system so that a recipient of the message can access the copy of the document.

10. The method of claim 1 further comprising defining user access permission in the document profile, wherein defining user access permission comprises acquiring the identity of the user from a source external to the document management system.

11. The method of claim 10 wherein the source of the identity of the user is an operating system security system or a database security system.

12. A method for managing documents in a computer implemented document management system, comprising:

creating a document profile that comprises fields of attributes of the document;

storing the document profile; and creating an email message via a messaging system external to the document management system comprising a link to the document profile using a selector within the document management system so that a recipient of the message can access the document associated with the document profile.

13. The method of claim 12 wherein the email message comprises a link to the document profile is created from within the document management system.

14. A method for managing documents in a computer implemented document management system, comprising:
creating a document profile that comprises fields of attributes of the document;
storing the document profile; and
creating an email message via a messaging system external to the document management system comprising a copy of the document using a selector within the document management system so that a recipient of the message can access the copy of the document.

15. A method for managing documents in a computer implemented document management system comprising:
for each document, creating a document profile that comprises fields of attributes of an associated document content;
storing the document profile in a database;
creating document content associated with the document profile;
storing the document content external to the database in a file system of a first storage device upon activating a save function;
setting in the document management system a system variable for at least a second storage to which the document content is to be automatically written when the save function is activated to provide redundancy;
automatically writing the document content to the second storage device upon activating a save function.

16. A computer implemented document management system, the computer including a processing unit and a storage device, the document management system comprising:
a module to create a document profile to be stored in a database in the storage device for a plurality of documents, the document profile comprising fields of attributes of an associated document;
a module to generate a unique identifier for each of the documents, the unique identifier comprising at least a first portion comprising information descriptive of a distinguishing characteristic of the associated document and at least a second portion comprising a number generated by the unique identifier generation module, the unique identifier being viewable by users of the document management system so that a group of the unique identifiers comprising a common first portion can be identified by the common first portion and distinguished from other unique identifiers comprising a different first portion.

17. The document management system of claim 16 wherein the document profile creation module comprises a module to require selection of a predefined document template from a set of predefined document templates for the document during creation of the document profile, the document template defining the format of the document.

18. The document management system of claim 16 wherein the document profile creation module comprises a module to link the document profile to a file type that is not created within the document management system.

19. The document management system of claim 16 further comprising a module to create an email message via a messaging system external to the document management system comprising a link to the document profile using a selector within the document management system so that a recipient of the message can access the document associated with the document profile.

20. The document management system of claim 16 further comprising a module to create an email message via a messaging system external to the document management system comprising a copy of the document using a selector within the document management system so that a recipient of the message can access the copy of the document.

21. The document management system of claim 16 further comprising a module to define user access permission in the document profile by acquiring the identity of the user from a source external to the document management system.

* * * * *